US008087689B2

(12) United States Patent
Fritz et al.

(10) Patent No.: US 8,087,689 B2
(45) Date of Patent: Jan. 3, 2012

(54) COMPACT COLLAPSIBLE STROLLER

(75) Inventors: Ward Fritz, Chelsea, MA (US);
Andrew W. Marsden, Hingham, MA
(US); Walter S. Bezaniuk, Berkley, MA
(US); Joe Langley, Riverside, RI (US)

(73) Assignee: Cosco Management, Inc., Wilmington, DE (US)

( * ) Notice: Subject to any disclaimer, the term of this patent is extended or adjusted under 35 U.S.C. 154(b) by 482 days.

(21) Appl. No.: 12/326,015

(22) Filed: Dec. 1, 2008

(65) Prior Publication Data
US 2010/0025968 A1    Feb. 4, 2010

Related U.S. Application Data

(60) Provisional application No. 61/085,373, filed on Jul. 31, 2008.

(51) Int. Cl.
B62B 7/00 (2006.01)
B62B 9/00 (2006.01)

(52) U.S. Cl. ........................... 280/647; 280/658
(58) Field of Classification Search .................. 280/38, 280/42, 47.38, 47.18, 87.051, 639, 642, 647, 280/650, 651, 652, 658
See application file for complete search history.

(56) References Cited

U.S. PATENT DOCUMENTS

| 2,986,400 | A | * | 5/1961 | Phillips | 280/7.17 |
|---|---|---|---|---|---|
| 4,216,974 | A | * | 8/1980 | Kassai | 280/42 |
| 4,294,464 | A | * | 10/1981 | Ettridge | 280/649 |
| 4,544,178 | A | * | 10/1985 | Al-Sheikh et al. | 280/642 |
| 4,614,454 | A | * | 9/1986 | Kassai | 403/62 |
| 5,257,799 | A | * | 11/1993 | Cone et al. | 280/642 |
| 5,590,896 | A | * | 1/1997 | Eichhorn | 280/642 |
| 6,095,548 | A | * | 8/2000 | Baechler | 280/650 |
| 6,102,431 | A | * | 8/2000 | Sutherland et al. | 280/642 |
| 6,102,432 | A | * | 8/2000 | Cheng | 280/642 |
| 6,105,998 | A | * | 8/2000 | Baechler et al. | 280/650 |
| 6,220,621 | B1 | * | 4/2001 | Newton | 280/650 |
| 6,345,836 | B1 | * | 2/2002 | Wu | 280/651 |
| 6,991,248 | B2 | * | 1/2006 | Valdez et al. | 280/647 |
| 7,077,420 | B1 | * | 7/2006 | Santoski | 280/642 |
| 7,237,795 | B2 | * | 7/2007 | Wu | 280/651 |
| 7,296,820 | B2 | * | 11/2007 | Valdez et al. | 280/647 |
| 7,350,791 | B2 | * | 4/2008 | Wu | 280/47.26 |
| 7,404,569 | B2 | * | 7/2008 | Hartenstine et al. | 280/642 |

(Continued)

FOREIGN PATENT DOCUMENTS
EP    1647463    4/2006
(Continued)

OTHER PUBLICATIONS

International Search Report dated Feb. 12, 2009, for International Application No. PCT/US 08/86415.

(Continued)

Primary Examiner — J. Allen Shriver, II
Assistant Examiner — Jacob Meyer
(74) Attorney, Agent, or Firm — Barnes & Thornburg LLP

(57) ABSTRACT

A juvenile stroller includes a mobile base and a juvenile seat mounted on the mobile base. The mobile base includes wheels and a foldable frame carrying the juvenile seat.

40 Claims, 16 Drawing Sheets

U.S. PATENT DOCUMENTS

| | | | |
|---|---|---|---|
| 7,552,487 B2 * | 6/2009 | Chen | 5/99.1 |
| 7,614,641 B2 * | 11/2009 | Hartenstine et al. | 280/642 |
| 7,632,035 B2 * | 12/2009 | Cheng | 403/98 |
| 7,798,515 B2 * | 9/2010 | Valdez et al. | 280/647 |
| 7,832,755 B2 * | 11/2010 | Nolan et al. | 280/642 |
| 7,832,756 B2 * | 11/2010 | Storm | 280/642 |
| 2003/0085551 A1 * | 5/2003 | Allen et al. | 280/642 |
| 2006/0038378 A1 * | 2/2006 | Lee | 280/278 |
| 2006/0082104 A1 * | 4/2006 | Wun | 280/650 |
| 2007/0075525 A1 * | 4/2007 | Nolan et al. | 280/642 |
| 2008/0246238 A1 * | 10/2008 | Wu | 280/47.18 |

FOREIGN PATENT DOCUMENTS

| | | |
|---|---|---|
| WO | 2008145523 | 12/2008 |

OTHER PUBLICATIONS

International Preliminary Report on Patentability (Chapter II) completed by the U.S. Examining Authority on Oct. 10, 2009.

* cited by examiner

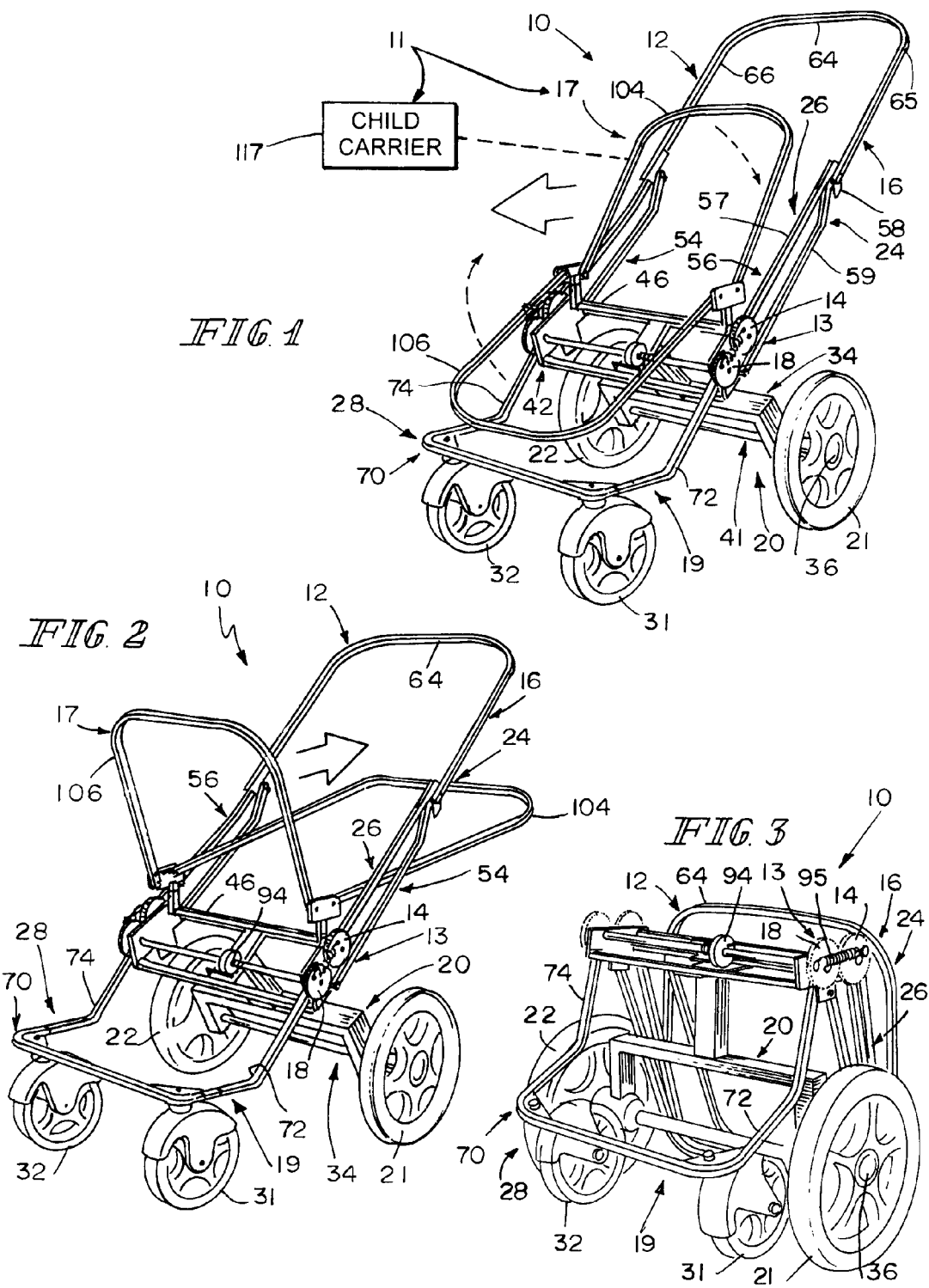

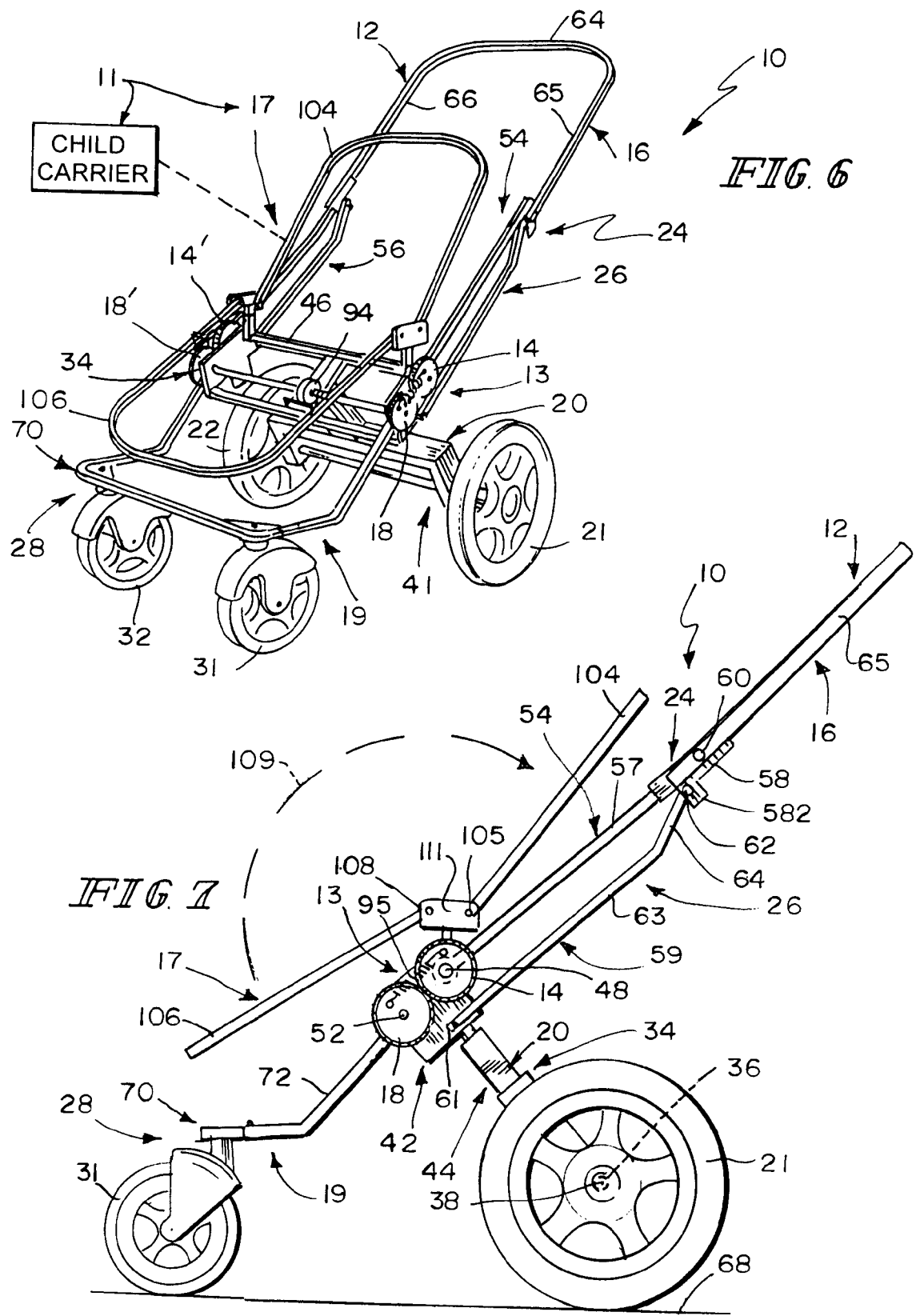

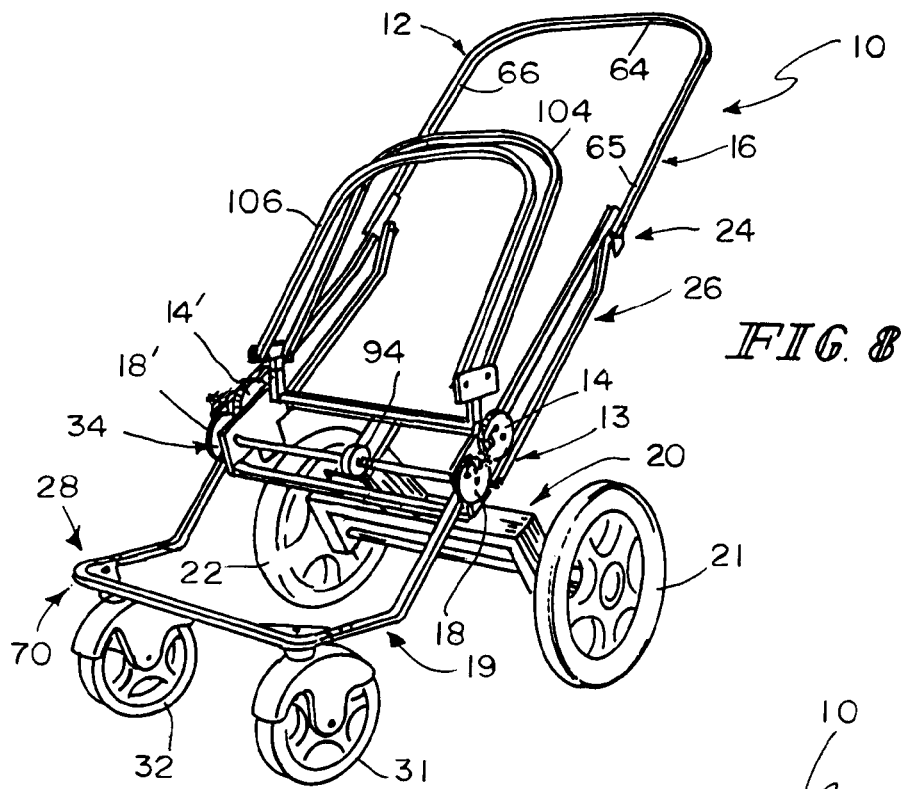
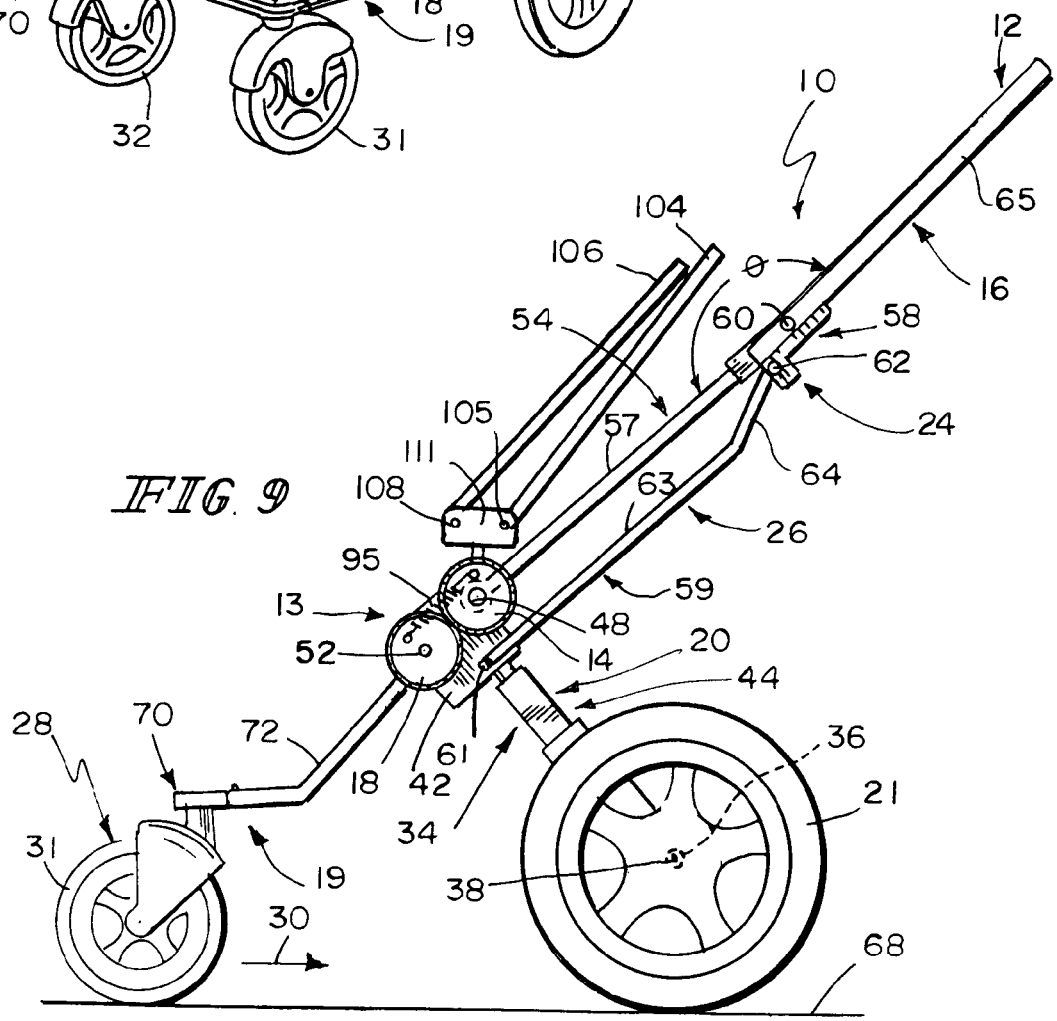

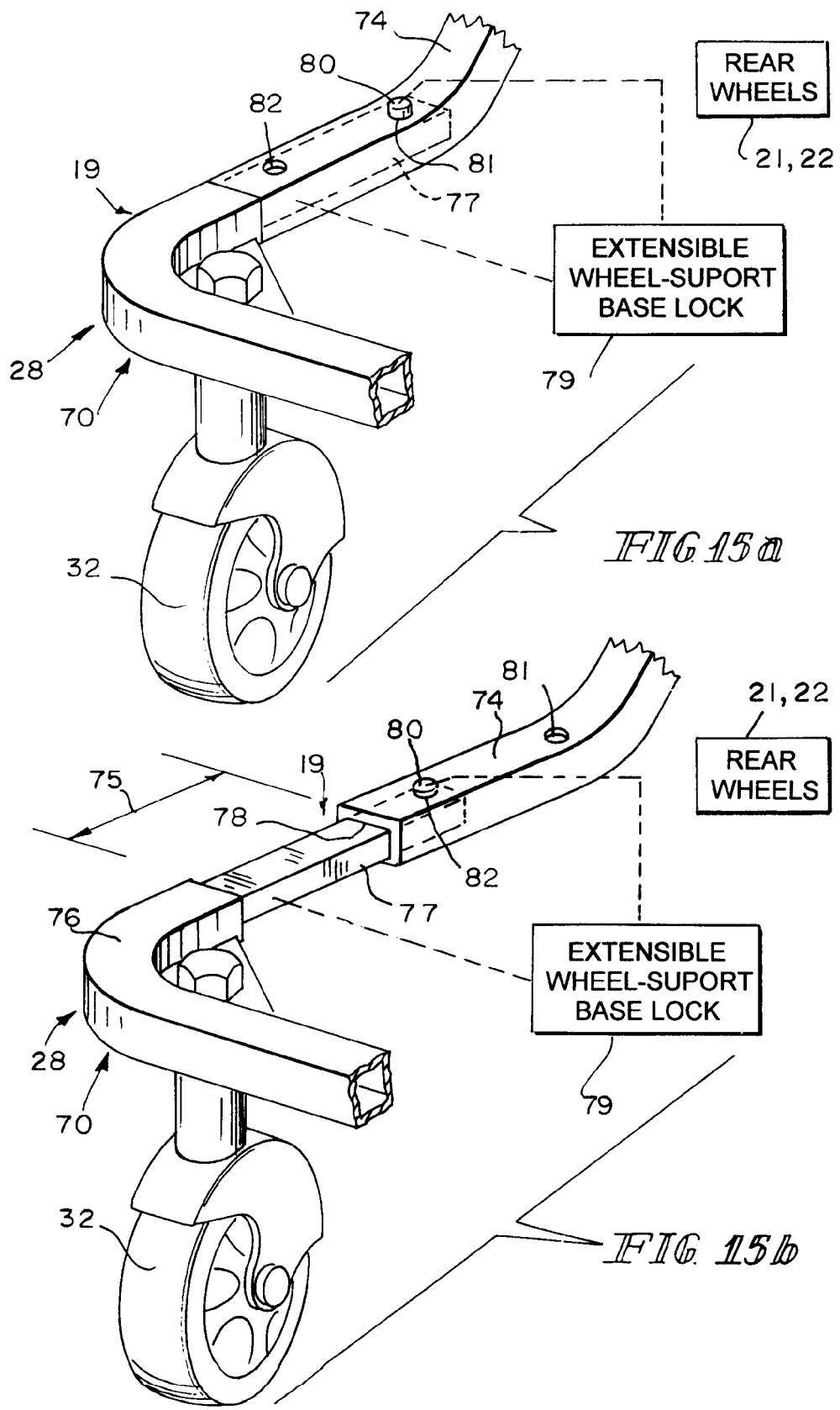

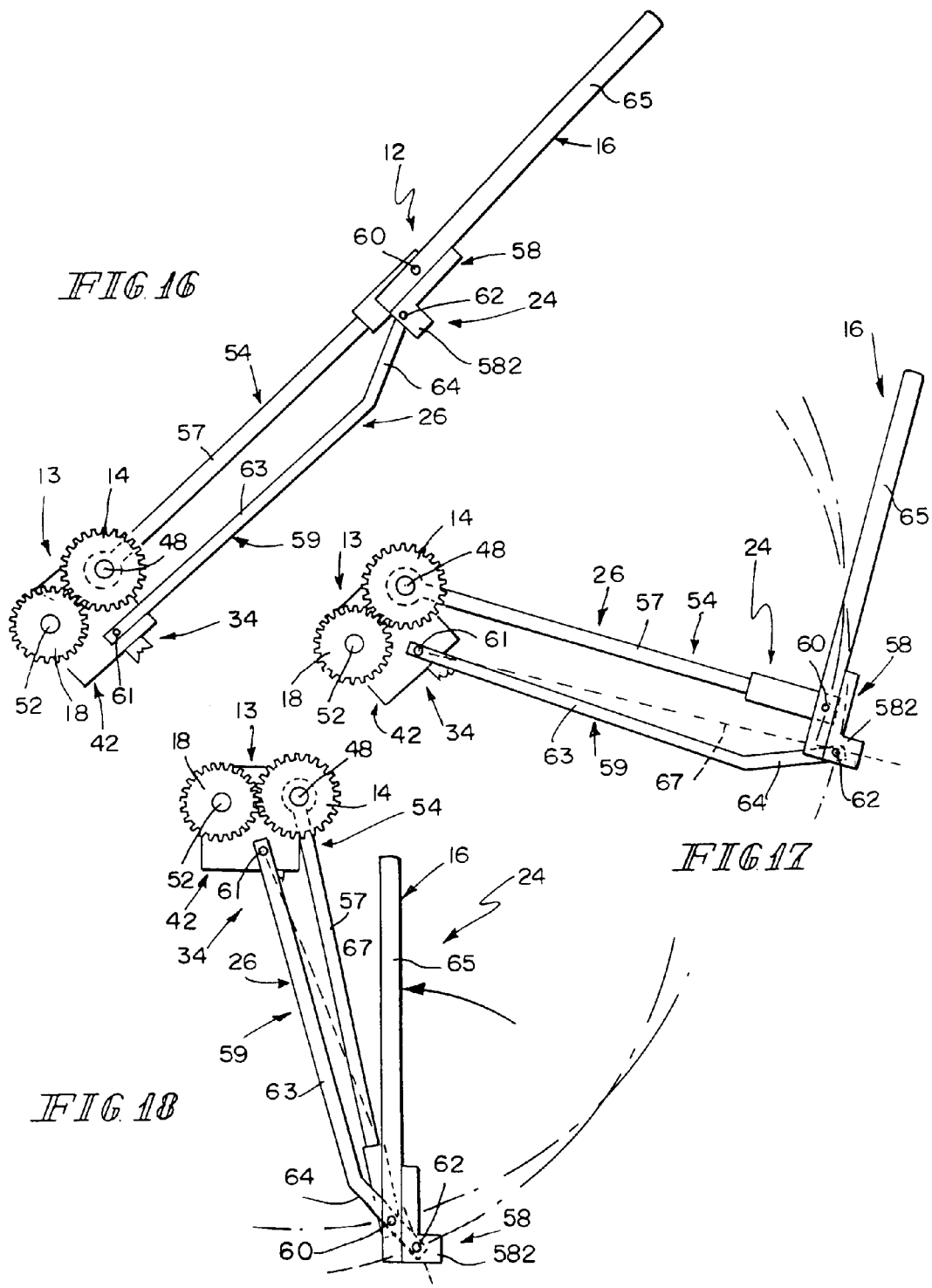

COMPACT COLLAPSIBLE STROLLER

This application claims priority under 35 U.S.C. §119(e) to U.S. Provisional Application Ser. No. 61/085,373, filed Jul. 31, 2008, which is expressly incorporated by reference herein.

BACKGROUND

The present disclosure relates to collapsible strollers for juveniles, and particularly to strollers including a collapsible frame assembly, a seat, and several wheels. More particularly, the present disclosure relates to collapsible frame assemblies for juvenile strollers.

Juvenile strollers are used widely to transport young children. Foldable strollers including collapsible frame assemblies can be placed in vehicle trunks or storage areas. Caregivers appreciate compact foldable strollers that do not require a lot of storage space so that space is available onboard a vehicle or elsewhere for storage of other items.

SUMMARY

A compact collapsible stroller in accordance with the present disclosure includes a mobile base and a juvenile seat coupled to the mobile base. The mobile base includes a foldable frame and wheels.

In illustrative embodiments, the mobile base of the compact collapsible stroller comprises a cart including two rear wheels and a gear-driven foldable frame mounted on the cart and configured to include two front wheels. Illustratively, the cart also includes a wheel axle interconnecting the two rear wheels and a frame mount coupled to the wheel axle. The gear-driven foldable frame is mounted on the frame mount of the cart for folding movement relative to the cart. The gear-driven foldable frame can be folded to establish a compact collapsed storage mode of the stroller and unfolded to establish an expanded use mode of the stroller In illustrative embodiments, the juvenile seat is mounted on the cart to move therewith. Illustratively, the juvenile seat includes a foldable carrier support mounted on the gear-driven foldable frame and a child carrier adapted to mount on the foldable carrier support to move therewith.

In illustrative embodiments, the gear-driven foldable frame includes a cart pusher coupled to a rear portion of the cart and a rolling cart stabilizer coupled to a front portion of the cart. The cart pusher includes a push handle, a rotatable rear gear axle coupled to the frame mount of the cart, and a drive gear coupled to the rear gear axle to rotate therewith relative to the frame mount during folding and unfolding of the gear-driven foldable frame. The rolling cart stabilizer includes a wheel mount coupled to the front wheels, a rotatable front gear axle coupled to the wheel mount, and a driven gear arranged to mate with the drive gear of the cart pusher and coupled to the front gear axle to rotate therewith relative to the frame mount during folding and unfolding of the gear-driven foldable frame.

Collapse of the collapsible stroller to assume a compact collapsed storage mode is initiated in illustrative embodiments by moving the cart pusher relative to the cart toward a folded rear position alongside a rear portion of the cart to rotate the drive gear in a first direction causing the mating driven gear to rotate in an opposite direction. Such rotation of the driven gear rotates the front gear axle included in the rolling cart stabilizer to cause pivoting movement of the rolling cart stabilizer relative to the cart about a front pivot axis established by the front gear axle toward a folded front position alongside a front portion of the cart. Those drive and driven gears are mated and used to transmit motion from the rotating rear gear axle of the cart pusher to the front gear axle of the rolling cart stabilizer to cause the rolling cart stabilizer to pivot from an unfolded front position extending in a forward direction away from the cart to a folded front position alongside the front portion of the cart whenever the cart pusher is moved by a caregiver from an unfolded rear position extending in a rearward direction away from the cart to a folded rear position alongside the rear portion of the cart.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 1 is a perspective view of a collapsible juvenile stroller (with all fabric coverings omitted) in accordance with the present disclosure that has been altered to assume an expanded use mode and showing that the juvenile stroller comprises a cart including two large rear wheels, a gear-driven foldable frame mounted on the cart and formed to include two small front wheels, and a juvenile seat including a child carrier and a foldable carrier support mounted on the gear-driven foldable frame and arranged to lie in a forward-facing orientation relative to the gear-driven foldable frame;

FIG. 2 is a perspective view similar to FIG. 1 showing that the foldable carrier support has been reconfigured manually by a caregiver to lie in a rearward facing orientation relative to the gear-driven foldable frame;

FIG. 3 is a perspective view of the juvenile stroller of FIGS. 1 and 2 after it has been collapsed by a caregiver to assume a compact collapsed storage mode in a manner shown, for example, in FIGS. 6-13;

FIGS. 6-13 show a collapsing sequence in which the juvenile stroller is collapsed to change from the expanded use mode shown in FIGS. 6 and 7 to the compact collapsed storage mode shown in FIG. 13;

FIG. 6 is a perspective view of the collapsible juvenile stroller in an illustrative expanded use mode;

FIG. 7 is an enlarged side elevation view of the juvenile stroller shown in FIG. 6 showing a gear system comprising a first drive gear (above and on the right) included in the rearwardly extending cart pusher in mating engagement with a companion first driven gear (below and on the left) include in the forwardly extending rolling cart stabilizer;

FIG. 8 is a view similar to FIG. 6 showing reconfiguration of the foldable carrier support to assume a folded position prior to folding the gear-driven foldable frame of the juvenile stroller;

FIG. 9 is an enlarged side elevation view of the juvenile stroller shown in FIG. 8;

FIG. 10 is a view similar to FIGS. 6 and 8 showing a first stage of folding of the gear-driven foldable frame to cause the front wheels to move closer to the rear wheels and to cause the push handle to pivot in a forward direction relative to the pivot-control linkage;

FIG. 11 is an enlarged side elevation view of the partly collapsed juvenile stroller of FIG. 10;

FIG. 12 is a view similar to FIG. 11 showing a subsequent second stage of folding of the gear-driven foldable frame;

FIG. 13 is a view similar to FIG. 12 showing the juvenile stroller in the compact collapsed storage mode also shown in FIGS. 3 and 4;

FIG. 15a is an enlarged partial and diagrammatic view of the rolling cart stabilizer of FIG. 1 showing that the rolling cart stabilizer includes a wheel mount and a front wheel coupled to the wheel mount and showing that the wheel mount comprises a rearwardly extending base-carrier rail, an extensible wheel-support base coupled to the base-carrier rail and to the front wheel, and an extensible wheel-support base lock;

FIG. 15b is a view similar to FIG. 15a showing the extensible wheel-support base after it has been moved relative to the companion base-carrier rail to an extended position from a retracted position shown in FIG. 15a to move the front wheel (to the left) away from the trailing rear wheels to lengthen the wheel base of the juvenile stroller;

FIGS. 16-18 show motion of the push handle relative to a left-side portion of the pivot-control linkage during folding movement of the gear-driven foldable frame to cause the juvenile stroller to assume the compact collapsed storage mode shown in FIG. 13;

FIG. 16 is an enlarged side elevation view of an upper portion of the foldable frame as shown in FIGS. 1, 2, and 5-9 when the gear-driven foldable frame is unfolded;

FIG. 17 shows a first stage of folding movement in which the handgrip of the push handle moves toward the mating gears included in the gear-driven foldable frame;

FIG. 18 shows a second stage of folding movement in which the push handle has moved to assume an over-center condition relative to the left-side portion of the pivot-control linkage to provide means for temporarily retaining the push handle in a fully folded position alongside the pivot-control linkage;

DETAILED DESCRIPTION

Figure 4:
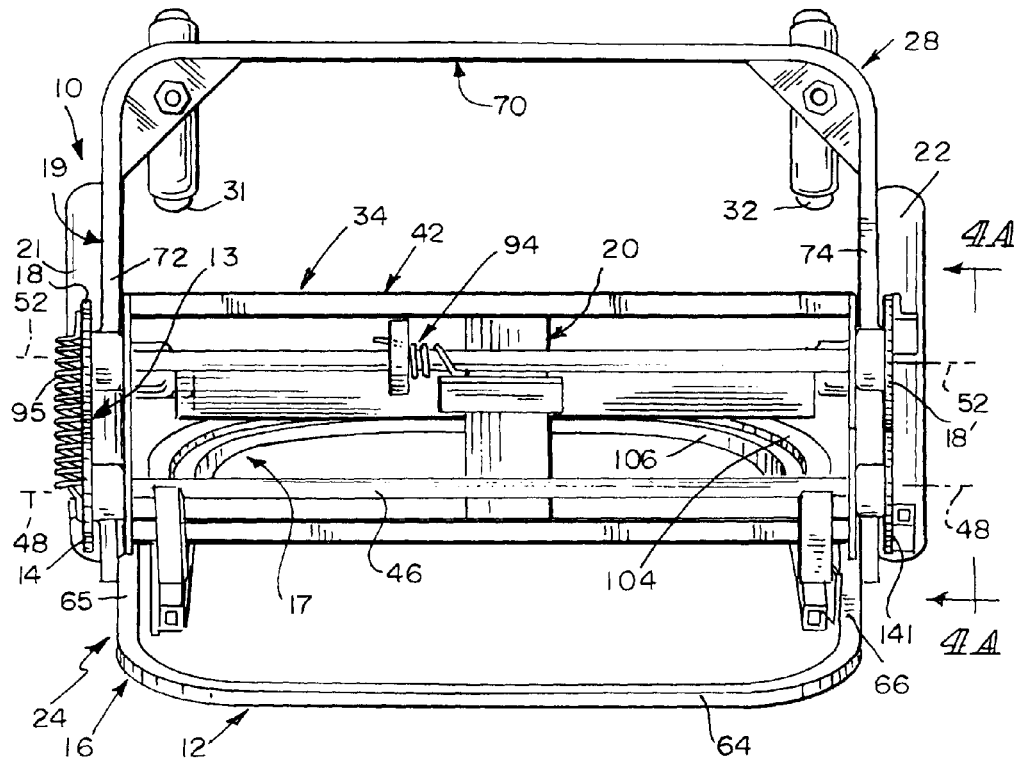
FIG. 4 is an enlarged top plan view of the collapsed juvenile stroller of FIG. 3 showing meshing engagement of the first and second drive gears of the pivot-control linkage of the cart pusher with the companion first and second driven gears of the rolling cart stabilizer.
Figure 13:
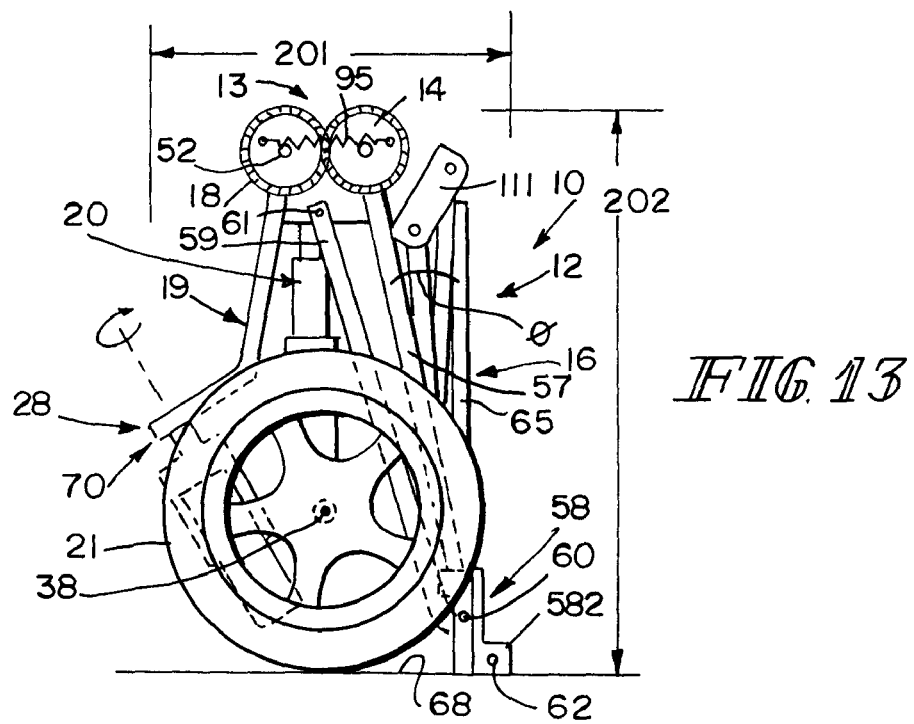

A juvenile stroller 10 is configured to be collapsed by a caregiver to change from an expanded use mode shown, for example, in FIGS. 1 and 6 to a compact collapsed storage mode shown, for example, in FIGS. 4 and 13 in a manner suggested, for example, in FIGS. 6-13. Juvenile stroller 10 includes a gear-driven foldable frame 12 having a gear system 13 configured to control folding and unfolding of components included in gear-driven foldable frame 12 as a caregiver changes the mode of juvenile stroller 10. In an illustrative embodiment, gear system 13 comprises a drive gear 14 associated with a push handle 16 included in gear-driven foldable frame 12 and a companion driven gear 18 associated with a front-wheel wheel mount 19 included in gear-driven foldable frame 12.

Figure 5:
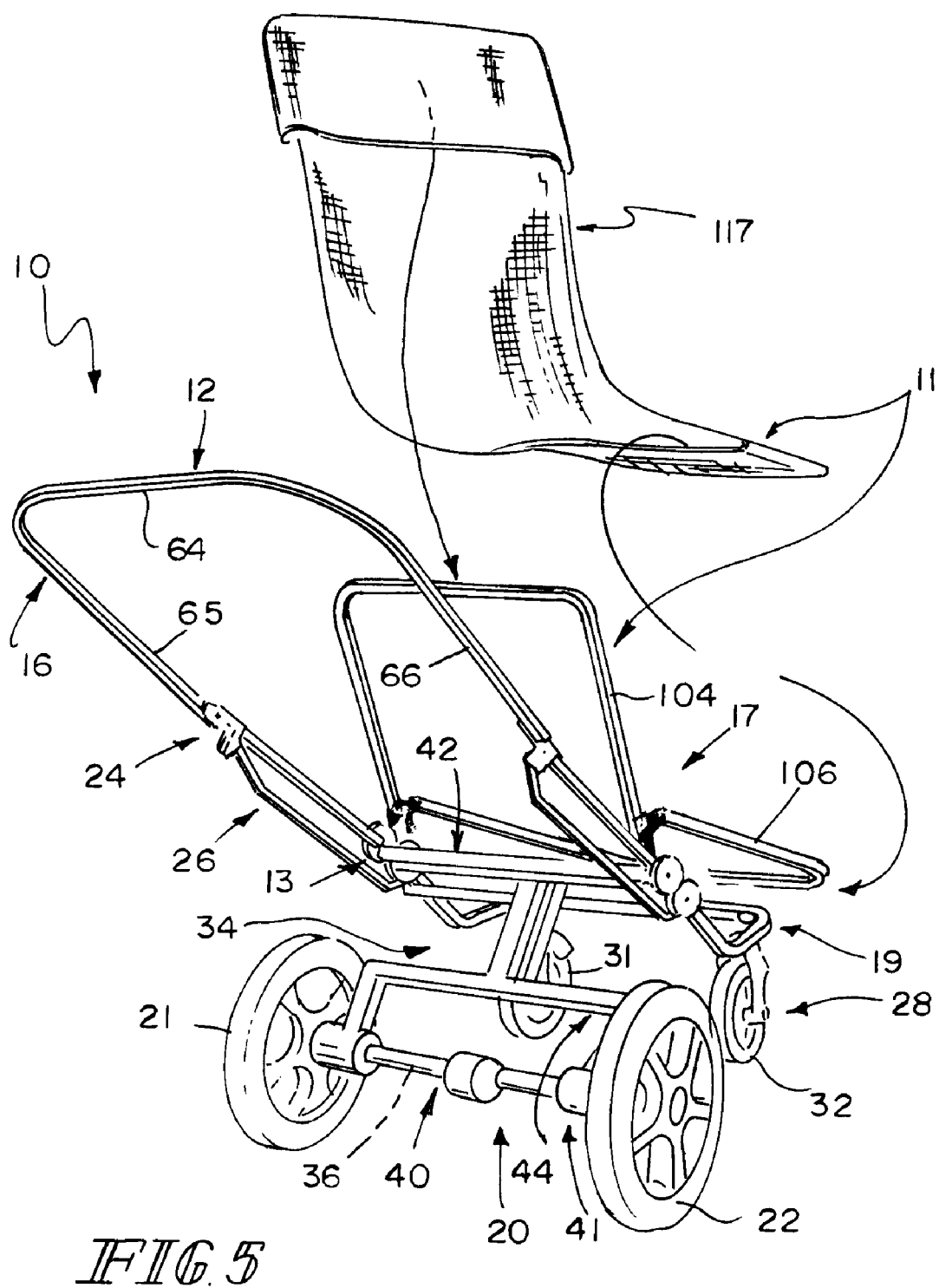
FIG. 5 is a rear perspective view of the juvenile stroller of FIG. 1 showing an illustrative child carrier made of a pliable fabric and adapted to be mounted on the foldable carrier support.

Juvenile stroller 10 also includes a foldable carrier support 17 configured to support a child carrier 117 as suggested in FIG. 5 and to be mounted on gear-driven foldable frame 12 as suggested in FIGS. 1 and 23-25. Child carrier 117 and foldable carrier support 17 cooperate to form a juvenile seat 11 as suggested diagrammatically in FIG. 1 and illustratively in FIG. 5. Juvenile seat 11 can be collapsed as suggested in FIGS. 6-11 during folding of gear-driven foldable frame 12.

Figure 1A:
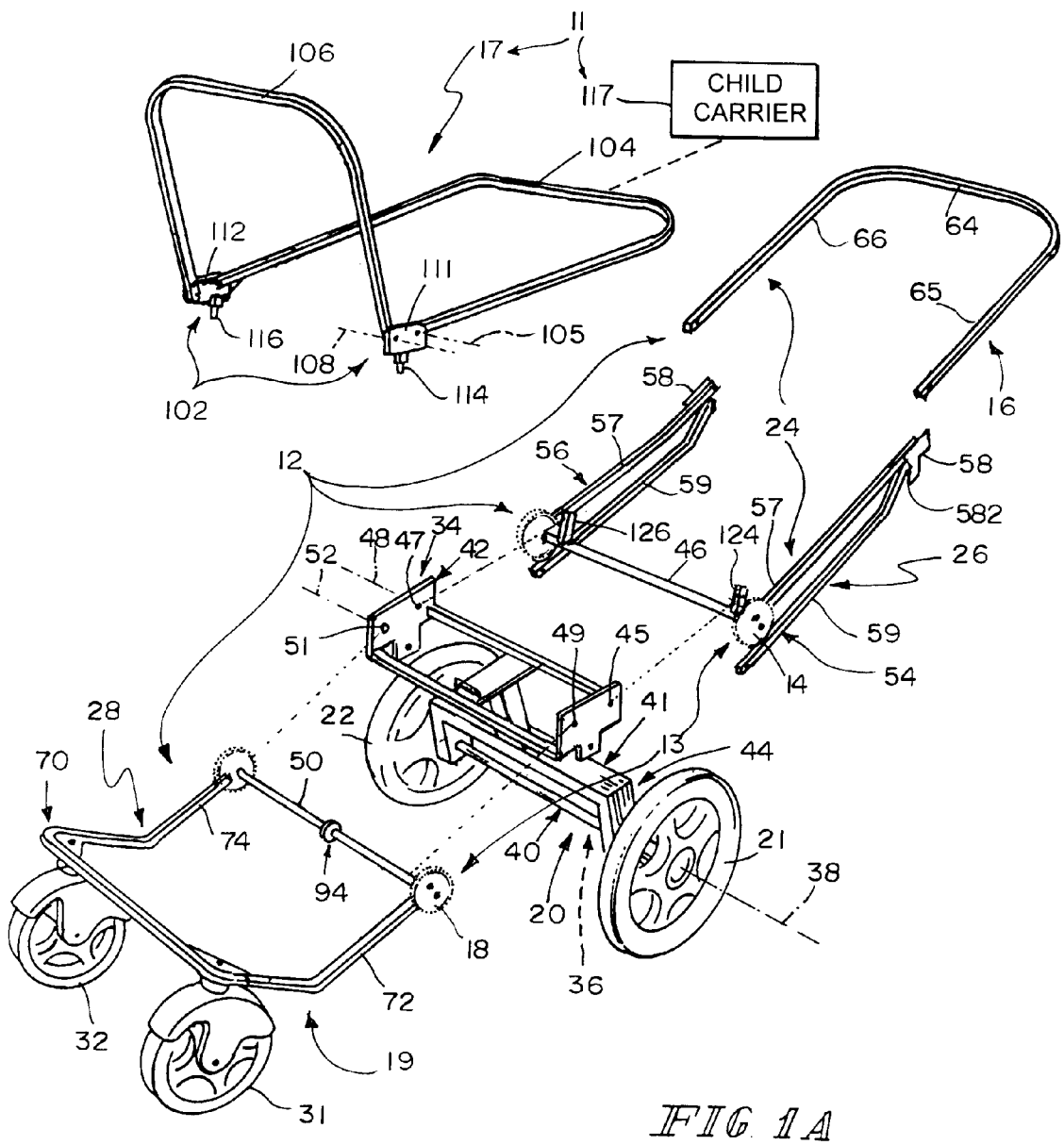
FIG. 1A is a diagrammatic exploded perspective assembly view showing components that cooperate to form the juvenile stroller of FIG. 1 and showing that the cart includes a frame mount coupled to a wheel axle interconnecting the two large rear wheels and the gear-driven foldable frame comprises a cart pusher including a push handle having a handgrip and a pivot-control linkage mating with the push handle and having first and second drive gears coupled to a rear gear axle sized to pass through two rearward gear axle-receiving apertures formed in the frame mount of the cart and a rolling cart stabilizer including the two small front wheels and first and second driven gears coupled to a front gear axle sized to pass through two forward gear axle-receiving apertures formed in the frame mount included in the cart and suggesting that the drive gears of the pivot-control linkage in the cart pusher are configured and arranged to mesh with companion driven gears of the rolling cart stabilizer to provide means for pivoting the rolling cart stabilizer about a front pivot axis established by the front gear axle in response to pivoting motion of the pivot-control linkage about a rear pivot axis established by the rear gear axle during folding and unfolding of the gear-driven foldable frame of the juvenile stroller as suggested, for example, in FIGS. 6-13.

As suggested in FIGS. 1 and 1A, juvenile stroller 10 includes a cart 20 including first and second rear wheels 21, 22, a cart pusher 24 including push handle 16 and a pivot-control linkage 26 providing drive gear 14, a rolling cart stabilizer 28 including front-wheel wheel mount 19, driven gear 18, and first and second front wheels 31, 32, and juvenile seat 11. Drive gear 14 included in cart pusher 24 mates with driven gear 18 included in rolling cart stabilizer 28 to establish gear system 13 and provide means for moving rolling cart stabilizer 28 to a folded front position alongside a front portion of cart 20 in response to movement of cart pusher 24 (initiated by a caregiver) to a folded rear position alongside a rear portion of cart 20 during change of juvenile stroller 10 from the expanded use mode to the compact collapsed storage mode as suggested, for example, in FIGS. 6-13.

As suggested in FIG. 1A, cart 20 includes a frame mount 34 configured to mate with gear-driven foldable frame 12 and a wheel axle 36 mounted on frame mount 34 for rotation about an axis of rotation 38. It is within the scope of this disclosure to provide frame mount 34 with any suitable shape and configuration. Wheel axle 36 is arranged to interconnect first and second rear wheels 21, 22 and to extend along axis of rotation 38. It is within the scope of the present disclosure to provide a separate wheel axle for each rear wheel 21, 22.

Figure 14:
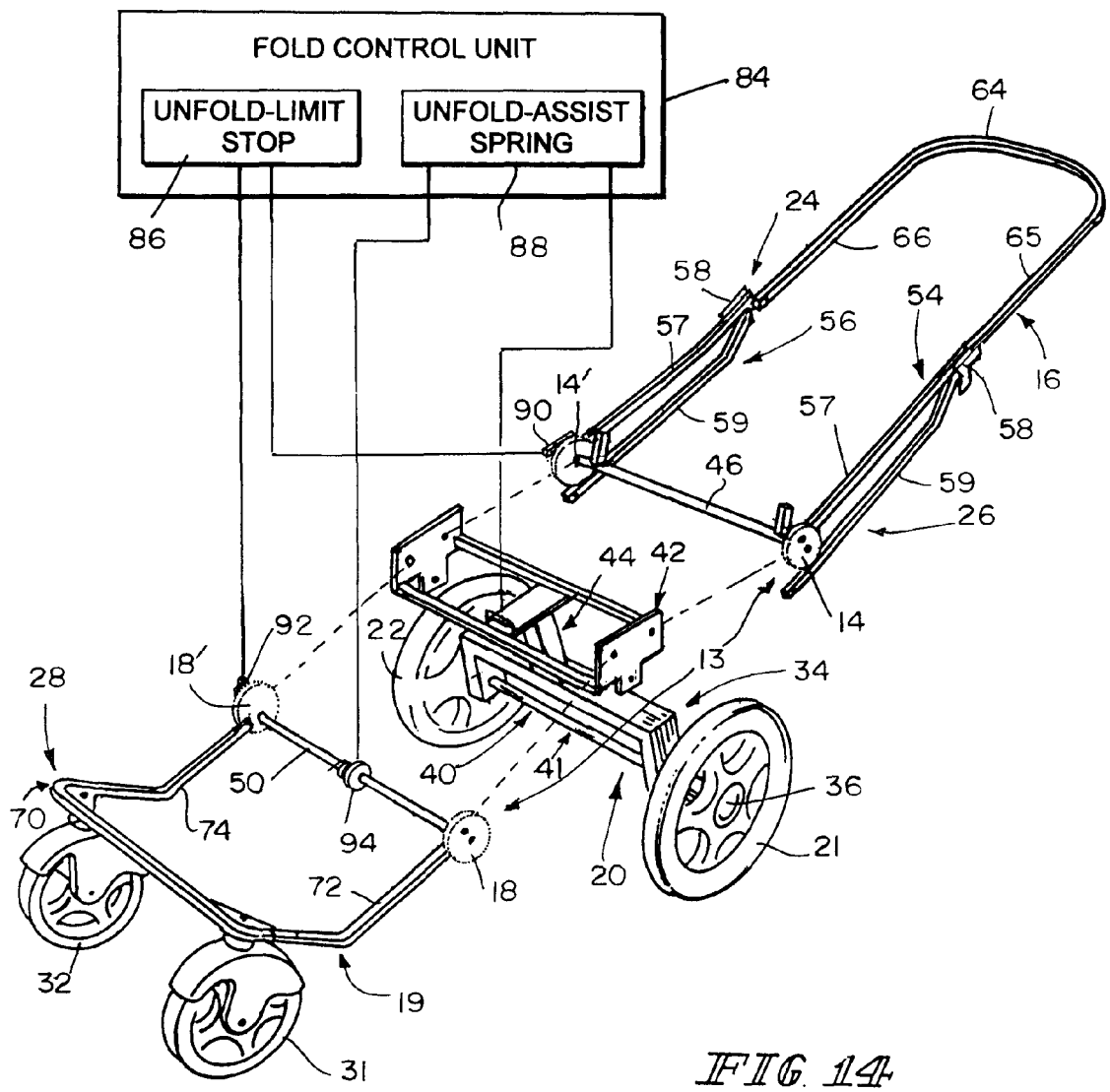
FIG. 14 is a diagrammatic view of an illustrative juvenile stroller (with the juvenile seat omitted) in accordance with the present disclosure showing an illustrative fold control unit comprising an unfold-limit stop coupled to the rolling cart stabilizer and to the cart pusher to provide means for limiting unfolding movement of the rolling cart stabilizer relative to the cart pusher during change of the juvenile stroller from the compact collapsed storage mode to the expanded use mode to establish the relative positions of the rolling cart stabilizer and the cart pusher in the expanded use mode and showing that the illustrative fold control unit also comprises an unfold-assist spring coupled to, for example, the cart and the rolling cart stabilizer to provide means for yieldably moving the rolling cart stabilizer relative to the cart in response to movement (initiated by a caregiver) of the push handle of the cart pusher away from the cart during change (initiated by the caregiver) of the juvenile stroller from the compact collapsed storage mode to the expanded use mode.
Figure 19:
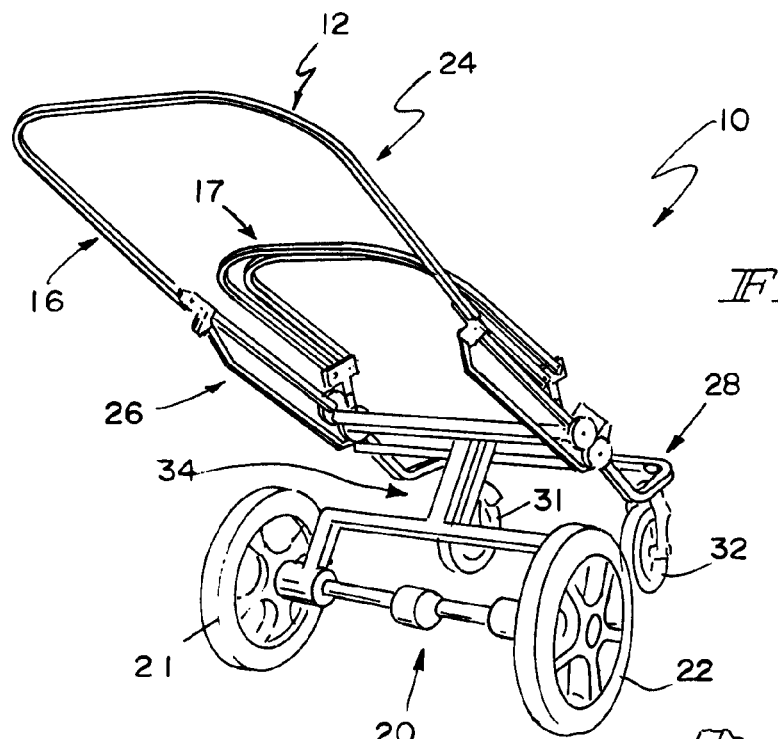
FIG. 19 is a rear perspective view of the juvenile stroller shown in FIGS. 1 and 6.
Figure 20:
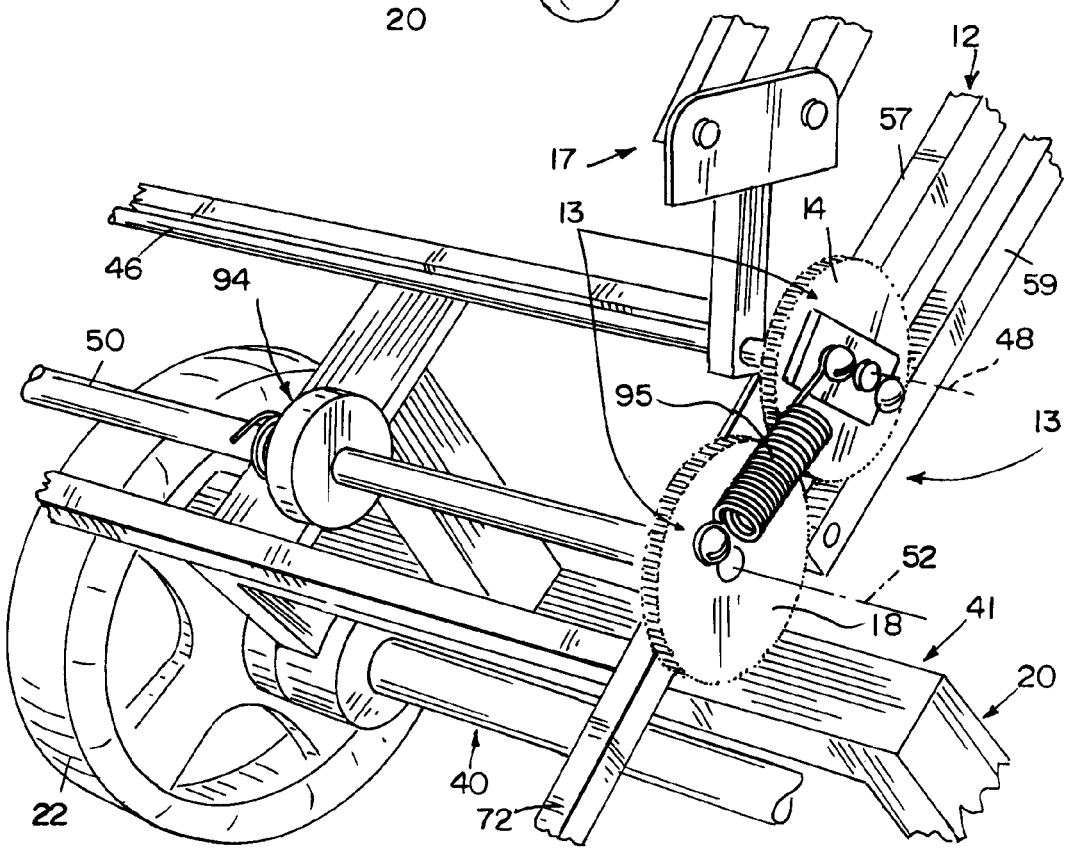
FIG. 20 is an enlarged perspective view of a portion of the juvenile stroller of FIG. 8 showing meshing engagement of the first drive gear of the cart pusher and the companion first driven gear of the rolling cart stabilizer.
Figure 21:
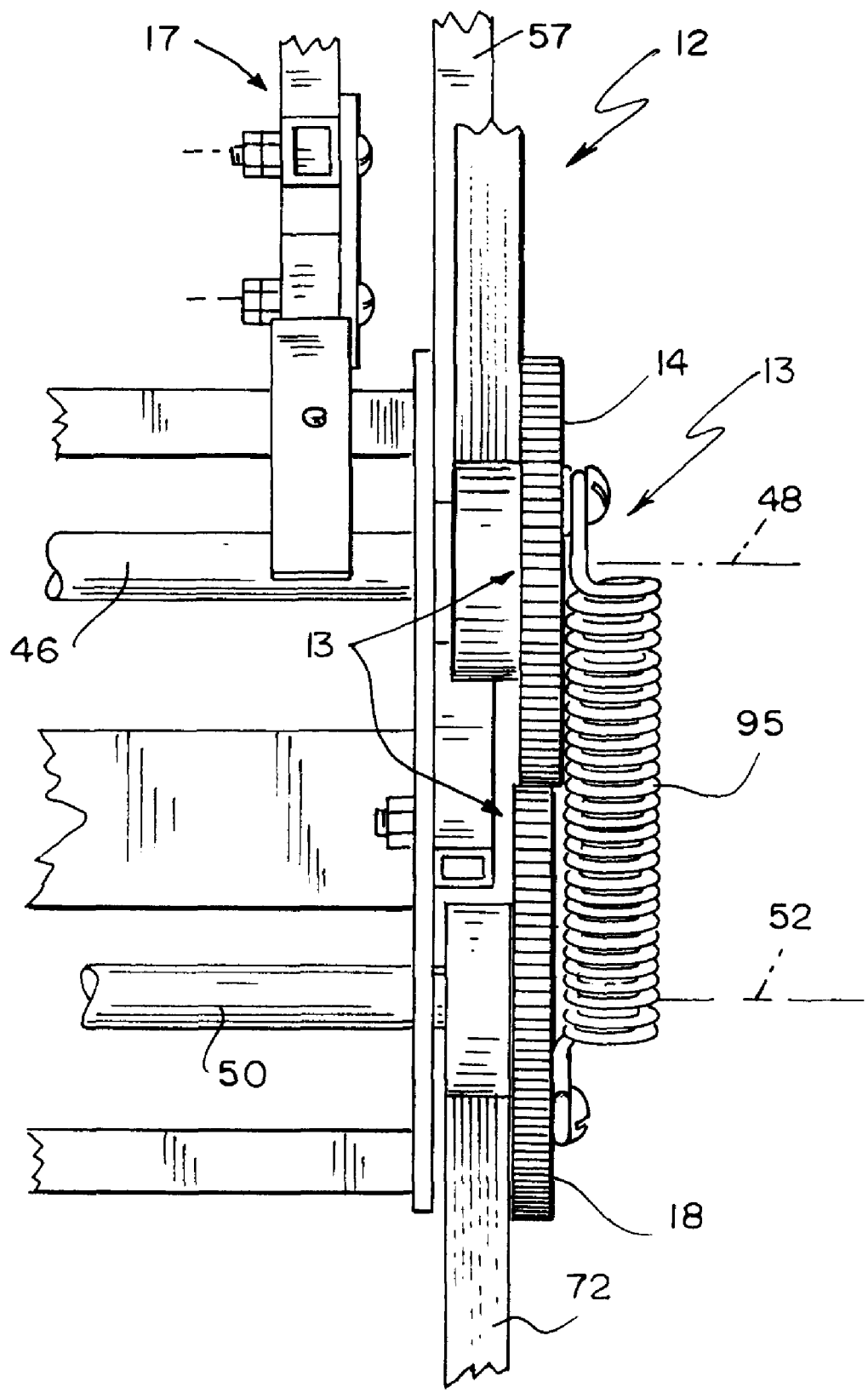
FIG. 21 is a top plan view of a portion of the folded juvenile stroller of FIG. 4.
Figure 22:
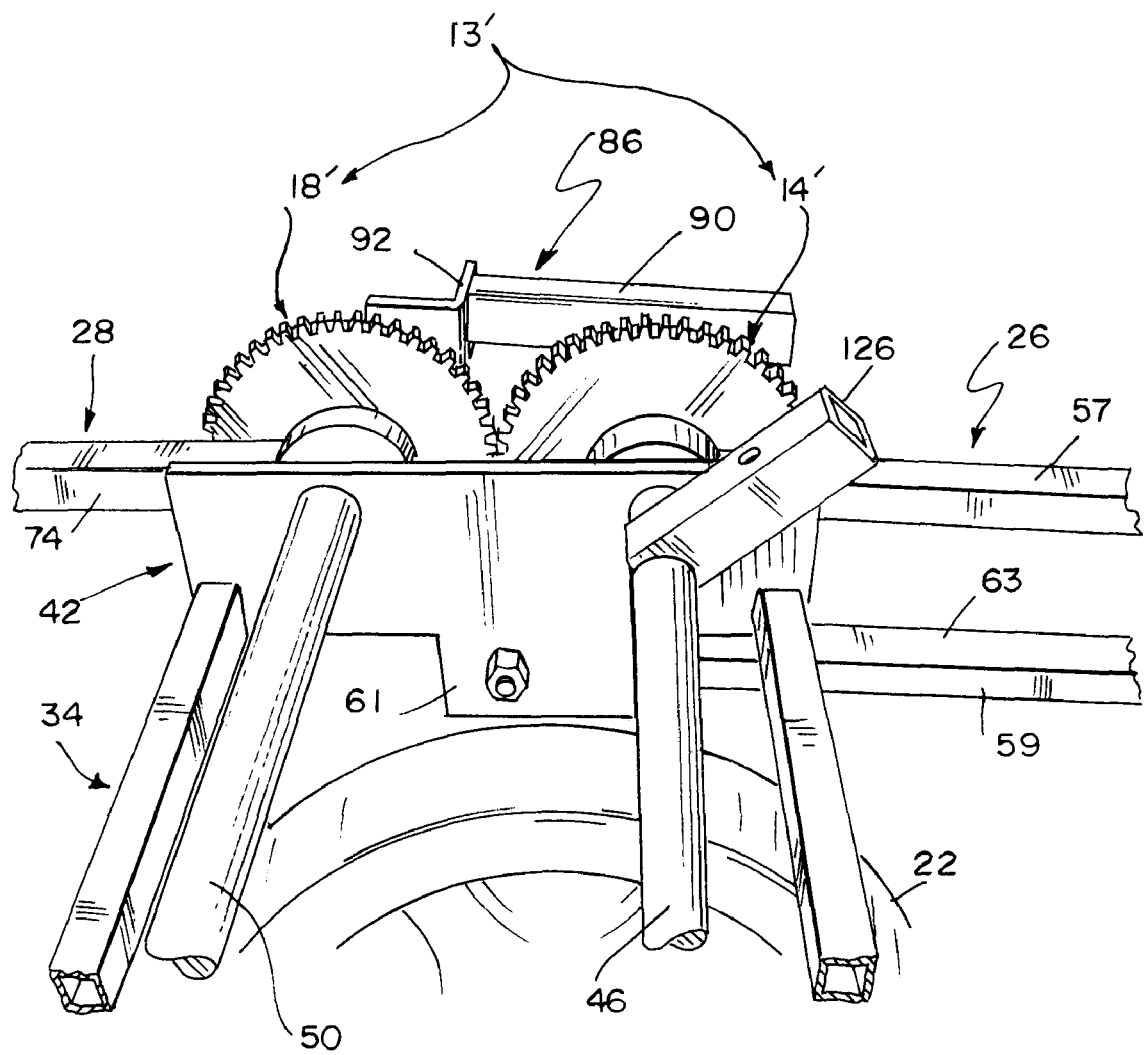
FIG. 22 is a reduced perspective view of the mating second drive gear of the cart pusher and the companion second driven gear of the rolling cart stabilizer shown in FIG. 21.

Frame mount 34 includes an axle support 40, a frame support 42, and a frame-support elevator 44 coupled to axle support 40 and frame support 42 as shown, for example, in FIGS. 1A, 5, and 14. Axle support 40 is configured to provide means for supporting wheel axle 36 for rotation about axis of rotation 38. Frame-support elevator 44 is configured to provide means for elevating frame support 42 above axle support 40 as suggested in FIGS. 1A, 5, and 14. Axle support 40 and frame-support elevator 44 cooperate to form a base 41 (see FIG. 1A) that is coupled to wheel axle 36 and arranged to mate with and underlie frame support 42.

Gear-driven foldable frame 12 is coupled to frame support 42 of frame mount 24 as suggested in FIG. 1A. A rear gear axle 46 coupled to drive gear 14 and included in pivot-control linkage 26 of cart pusher 24 is sized and arranged to pass through first and second rearward gear axle-receiving apertures 45, 47 formed in frame support 42 to support pivot-control linkage 26 (and cart pusher 24) for pivotable movement relative to cart 20 about a rear pivot axis 48 established, for example, by rear gear axle 46. A front gear axle 50 coupled to driven gear 18 and included in rolling cart stabilizer 28 is sized and arranged to pass through first and second forward gear axle-receiving apertures 49, 50 formed in frame support 42 to support rolling cart stabilizer 28 for pivotable movement relative to cart 20 about a front pivot axis 52 established, for example, by front gear axle 50.

Cart pusher 24 includes push handle 16 and pivot-control linkage 26 in an illustrative embodiment as suggested in FIG. 1A. An inner portion of pivot-control linkage 26 is mounted on frame support 42 for pivotable movement about rear pivot axis 48 as suggested in FIGS. 6-13 and FIGS. 16-18.

Pivot-control linkage 26 includes left-side and right-side portions 54, 56, rear gear axle 46, a first drive gear 14 coupled to one end of rear gear axle 46, and a second drive gear 14' coupled to an opposite end of rear gear axle 46 as shown, for example, in FIG. 1A. Rear gear axle 46 is arranged to interconnect first and second drive gears 14, 14' and extend through a suitable axle journal such as first and second rearward gear axle-receiving apertures 45, 47 formed in frame support 42 of cart 20. It is within the scope of the present disclosure to separate rear gear axle 46 into discrete and separate segments (e.g. a short rear gear axle for first drive gear 14 and a separate short rear gear axle for second drive gear 14) arranged to extend substantially along rear pivot axis 48.

Figure 11:
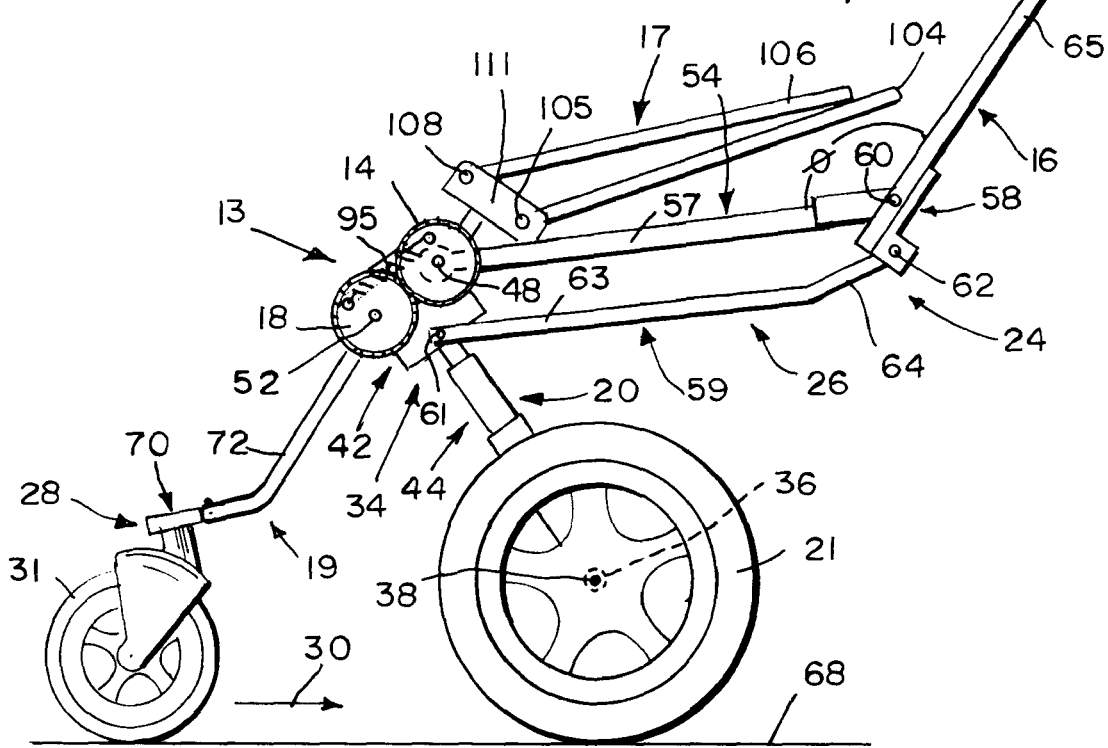
Figure 12:
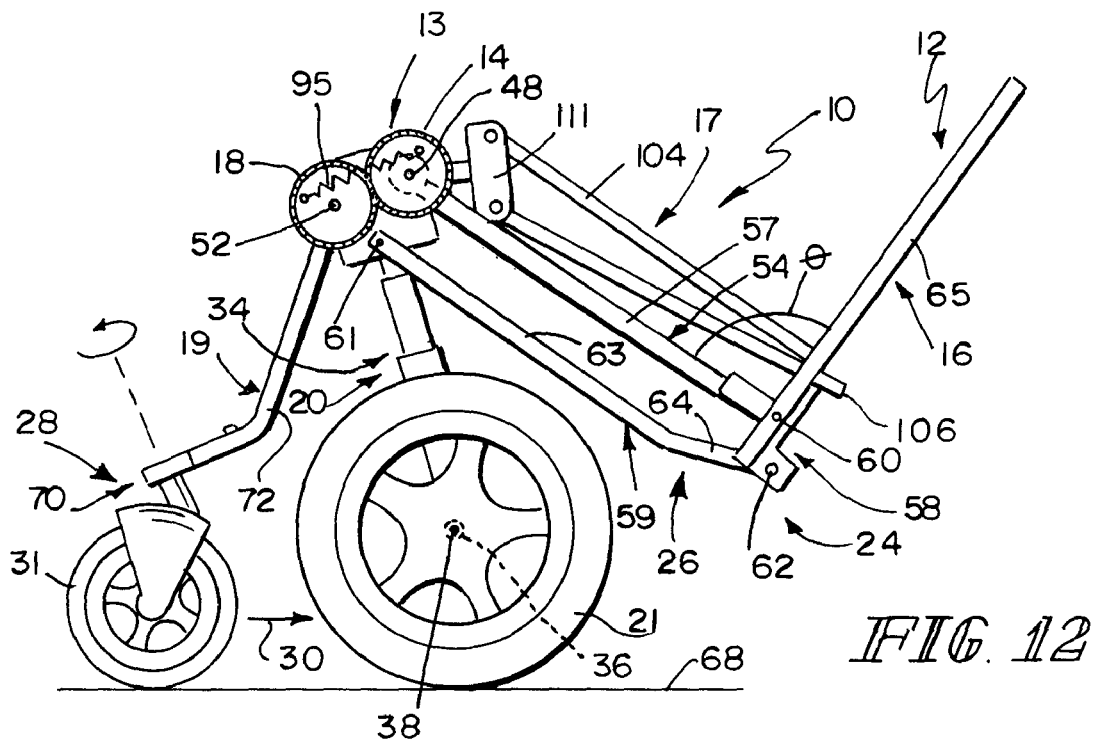

Each of left-side and right-side portions 54, 56 of pivot-control linkage 26 includes an upper rail 57, a lower rail 59, and a medial rail 58 as suggested, for example, in FIGS. 1A, 9, and 11. Upper rail 57 is coupled at one end thereof to rear gear axle 46 and at an opposite end thereof to medial rail 58 at (handle) pivot 60. Lower rail 59 is coupled at one end thereof to frame support 42 at pivot 61 and at an opposite end thereof to medial rail 58 at pivot 62. Lower rail 59 includes an inner segment 63 that is coupled to frame support 42 at pivot 61 and arranged to lie in substantially spaced-apart parallel relation to upper rail 57 upon movement of cart pusher 24 to the unfolded rear position as suggested in FIGS. 7 and 9. Lower rail 59 also includes an outer segment 64 that is mated with inner segment 63 to define an obtuse included angle therebetween (see FIG. 7) and that is coupled at a free end thereof to medial rail 58 at (handle) pivot 62. In an illustrative embodiment, medial rail 58 is L-shaped and includes a short segment coupled to lower rail 59 at pivot 62 and a relative longer segment coupled to upper rail 57 at handle pivot 60.

Push handle 16 includes a handgrip 64, a first arm 65 coupled to one end of hand grip 64, and a second arm 66 coupled to an opposite end of handgrip 64 in an illustrative embodiment shown in FIG. 1A. A free end of first arm 65 is coupled to the relatively longer segment of medial rail 58 of left-side portion 54 of pivot-control linkage 26 to provide means for supporting first arm 65 for pivotable movement relative to upper rail 57 of left-side portion 54 about handle pivot 60 and relative to lower rail 59 of left-side portion 56 about pivot 62 (as shown in FIGS. 16-18) during folding movement of cart pusher 24 from the unfolded rear position shown in FIGS. 7 and 16 to the folded rear position shown in FIGS. 13 and 18. During such movement, an over-center condition relating to handle pivot 60 exists as suggested in FIGS. 16-17 wherein handle pivot 60 is moved from a point above a reference line 67 interconnecting pivots 61, 62 as shown in FIG. 17 to a point below that reference line 67 as shown in FIG. 18 to provide means for retaining push handle 16 in a nested position alongside upper rail 57 of left-side portion 54 of pivot-control linkage 26 to enhance the compactness of the collapsed juvenile stroller 10 as suggested in FIGS. 3, 13, and 18. As suggested in FIGS. 16-18, this over-center condition vanishes as soon as a caregiver pulls on push handle 16 to move push handle 16 away from pivot-control linkage 26 as suggested in a sequence shown in FIGS. 18. 17, and 16 to change juvenile stroller 10 from a compact collapsed storage mode shown in FIGS. 3, 13, and 18 to an expanded use mode shown in FIGS. 6, 7, and 16.

In illustrative embodiments, medial rail 58 is configured to form a kickstand providing means for engaging ground 68 underlying stroller 10 to support stroller 10 in a stable position when stroller 10 is changed to assume the compact collapsed storage mode as suggested in FIG. 13. In the illustrated embodiment, the relatively shorter segment 582 of the L-shaped medial rail 58 (associated with pivot 62) engages ground 68 and cooperates with rear wheel 21 to steady stroller 10 in the compact collapsed storage mode.

Rolling cart stabilizer 28 includes front-wheel wheel mount 19, front gear axle 50, first driven gear 18 coupled to one end of front gear axle 50, and second driven gear 18' coupled to an opposite end of front gear axle 50 as shown, for example, in FIG. 1A. Front gear axle 50 is arranged to interconnect first and second driven gears 18, 18' and extend through a suitable axle journal such as first and second forward gear axle-receiving apertures 49, 51 formed in frame support 42 of cart 20. It is within the scope of the present disclosure to separate front gear axle 50 into discrete and separate segments (e.g. a short front gear axle for first driven gear 18 and a separate short front gear axle for second driven gear 18) arranged to extend substantially along front pivot axis 52.

Front-wheel wheel mount 19 includes a wheel-support base 70 coupled to front wheels 31, 32, a left-side base-carrier rail 72 interconnecting front gear axle 50 and one end of wheel-support base 70, and a right-side base-carrier rail 74 interconnecting front gear axle 50 and an opposite end of wheel-support base 70 as shown, for example, in FIG. 1A. In an illustrative embodiment, each of base-carrier rails 72, 74 is shaped to resemble a hockey stick and includes a shorter horizontal segment coupled to wheel-support base 70 and a relatively longer inclined segment coupled to front gear axle 50 as suggested in FIGS. 1A, 6, and 7. Wheel-support base 70 has a U-shaped configuration when viewed in plan as suggested in FIG. 4.

In illustrative embodiments, wheel-support base 70 is configured to be extensible as suggested in FIGS. 15a and 15b. Extensible wheel support base 70 is arranged to be moved by a caregiver from a retracted position shown in FIG. 15a to an extended position shown in FIG. 15b to an extended position shown in FIG. 15b to move front wheels 31, 32 away from the trailing rear wheels 21, 22 to lengthen the wheel base (i.e., the distance between the front and rear wheels) of juvenile stroller 10 by a length 75 illustrated in FIG. 15b. In the illustrated embodiment, as suggested in FIGS. 15a and 15b, wheel-support base 70 includes a U-shaped frame 76, a rod 77 cantilevered to one end of U-shaped frame 76 and arranged to extend into and move in a rod-receiving channel 78 formed in companion base-carrier rail 74, and a rod (not shown) cantilevered to an opposite end of U-shaped frame 76 and arranged to extend into and move in a rod-receiving channel (not shown) formed in companion base-carrier rail 72.

An extensible wheel-support base lock 79 is included in wheel mount 19 for each rod to provide means for locking the rod in either the retracted or extended positions as suggested in FIGS. 15a and 15b. In an illustrative embodiment, extensible wheel-support base lock 79 comprises a spring-loaded detent 80 coupled to rod 77 to move therewith and spaced-apart first and second detent-receiving apertures 81, 82 formed in companion base carrier rail 74. In a shortened wheel-base mode, detent 80 extends upwardly from rod-receiving channel 78 into first detent-receiving aperture 81 to lock wheel-support base 70 in the retracted position as shown, for example, in FIG. 15a. In a lengthened wheel-base mode, detent 80 extends upwardly into second detent-receiving aperture 82 to lock wheel-support base 70 in the extended position as shown, for example, in FIG. 15b.

It is within the scope of this disclosure to include a dampening system in juvenile stroller 10 to control movement of rolling cart stabilizer 28 relative to cart 20. In a first embodiment, a multi-steel plate clutch is provided with a tungsten polymer compound between the plates. The drag will work only in the unfolding direction when folding. The drive is connected by a pawl engaging a gear. In a second embodiment, an adjustable rotary damper is provided with flexible friction vanes and/or packed with a polymer compound (like a silicone plastics material having properties similar to SILLY PUTTY® material). In a third embodiment, pneumatic and/or hydraulic cylinders operated by a gear rack or crank arm are provided.

As suggested in FIG. 14, juvenile stroller 10 also includes a fold control unit 84 comprising an unfold-limit stop 86 and an unfold-assist spring 88. Fold control unit 84 is coupled, for example, to gear-driven foldable frame 12 as suggested in FIG. 14. Fold control unit 84 functions to establish relative positions of cart 20, cart pusher 24, and rolling cart stabilizer 28 when a caregiver causes stroller 10 to assume the expanded use mode and functions to generate spring forces to assist the caregiver to move those components relative to one another during change of stroller 10 from the compact collapsed storage position to the expanded use position.

An illustrative unfold-limit stop 86 is coupled to rolling cart stabilizer 28 and to cart pusher 24 as suggested diagrammatically in FIG. 14 to provide means for limiting unfolding movement of rolling cart stabilizer 28 relative to cart pusher 24 during change of juvenile stroller 10 from the compact collapsed storage mode to the expanded use mode to establish the relative positions of rolling cart stabilizer 28 and push cart 24 in the expanded use mode.

Figure 4A:
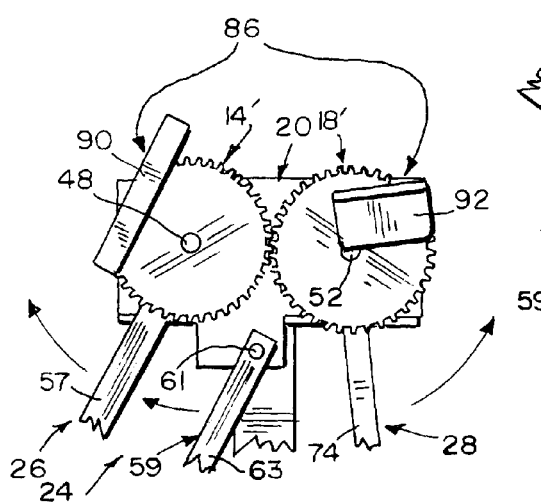
FIG. 4A is a reduced right-side side elevation view taken along line 4A-4A of FIG. 4 showing a motion-blocking post coupled to the pivot-control linkage of the cart pusher (on the left) arranged to lie in separated relation to a companion foundation plate coupled to the rolling cart stabilizer (on the right) when the juvenile stroller is collapsed to assume the compact collapsed storage mode shown in FIGS. 3 and 4.
Figure 4B:
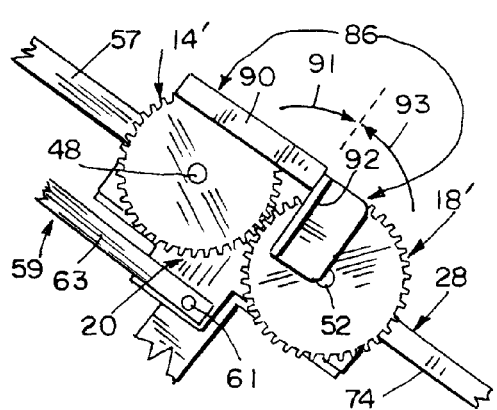
FIG. 4B is a view similar to FIG. 4A showing that the motion-blocking post is moved in a clockwise direction about the rear pivot axis established by the rotatable rear gear axle to engage the companion foundation plate when the gear-driven foldable frame of the juvenile stroller is unfolded to establish an unfold-limit stop system to limit movement of the pivot-control linkage of the cart pusher relative to the rolling cart stabilizer to establish the expanded use mode of the stroller as suggested in FIGS. 1, 2, and 6-9.

In an illustrative embodiment shown in FIGS. 4A and 4B, unfold-limit stop 86 comprises a motion-blocking post 90 coupled to pivot-control linkage 26 of cart pusher 24 to move therewith relative to cart 20 and a companion foundation plate 92 coupled to rolling cart stabilizer 28 to move therewith. In an illustrative embodiment, motion-blocking post 90 is coupled to drive gear 14' to rotate therewith and foundation plate 92 is coupled to companion driven gear 18' to rotate therewith relative to cart 20.

As suggested in FIG. 4A, motion-blocking post 90 is arranged to lie in separated relation to companion foundation plate 92 when juvenile stroller 10 is collapsed to assume the compact collapsed storage mode. As suggested in FIG. 4B, motion-blocking post 90 is moved in a clockwise direction 91 about rear pivot axis 48 (while foundation plate 93 is moved in a counterclockwise direction 93 about front pivot axis 52) to engage foundation plate 93 when juvenile stroller 10 is uncollapsed to limit rotation of drive gear 14' about rear pivot axis 48 and also limit movement of pivot-control linkage 26 of cart pusher 24 relative to rolling cart stabilizer 28 to establish the expanded use mode of juvenile stroller 10.

An illustrative unfold-assist spring 88 is coupled to cart 20 and cart pusher 24 (e.g., pivot-control linkage 26) as suggested diagrammatically in FIG. 14 to provide means for yieldably moving rolling cart stabilizer 28 relative to cart 20 in response to unfolding movement (initiated by a caregiver) of cart pusher 24 away from cart 20 during change (initiated by the caregiver) of juvenile stroller 10 from the compact collapsed storage mode to the expanded use mode. In an illustrative embodiment, unfold-assist spring 88 comprises a torsion spring 94 coupled to front gear axle 50 and frame mount 34 of cart 20 as suggested in FIG. 4. In the illustrated embodiment, unfold-assist spring 88 further comprises a compression spring 95 coupled to companion drive gear 14 and driven gear 18 as suggested in FIGS. 4, 7, 9, 11, 12, and 13.

A foldable carrier support 17 is configured to carry any suitable child carrier 17 to establish juvenile seat 11 as suggested diagrammatically in FIG. 1 and illustratively in FIG. 5. Foldable carrier support 17 is configured to fold as shown in FIGS. 1, 2, and 6-13 and to be mounted on gear-driven foldable frame 12 as shown, for example, in FIGS. 23-25.

Foldable carrier support 17 includes first and second mount unit 102, a first seat rail 104 mounted on mount unit 102 for pivotable movement about a first pivot axis 105, and a second seat rail 106 mounted on mount unit 102 for pivotable movement about a second pivot axis 108 as suggested in FIG. 14. In an illustrative embodiment, pivot axes 105 and 108 are separated; however, in another embodiment contemplated in the present disclosures, such pivot axes 105 and 108 are aligned in coextensive relation to one another to establish a single pivot axis for first and second seat rails 104, 106.

Each of first and second seat rails 104, 106 is U-shaped in the illustrated embodiment. First and second seat rails 104, 106 are sized to fit within an interior region bounded by push handle 16 and left- and right-side portions 54, 56 of pivot-control linkage 26 (see FIG. 4) when stroller 10 is changed to assume the compact collapsed storage mode as suggested, for example, in FIGS. 2, 3, 4, 8, and 13.

Mount unit 102 includes first and second plates 111, 112, a first mount post 114 coupled to first plate 111, and a second mount post 116 coupled to second plate 112 as suggested in FIG. 1A. First seat rail 104 is pivotably coupled to each of first and second plates 111, 112 to establish first pivot axis 105. Second seat rail 106 is pivotably coupled to each of first and second plates 111, 112 to establish second pivot axis 108.

Figure 23:
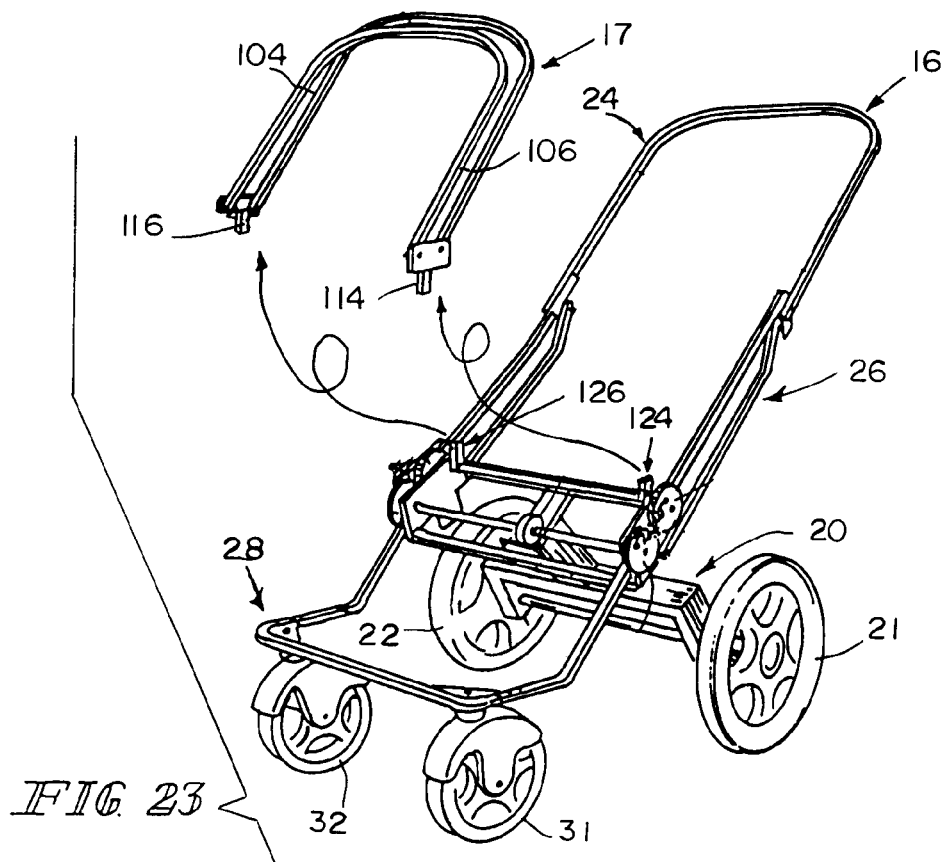
FIG. 23 is a view similar to FIG. 1 after removal of the foldable carrier support from the gear-driven foldable frame.
Figure 24:
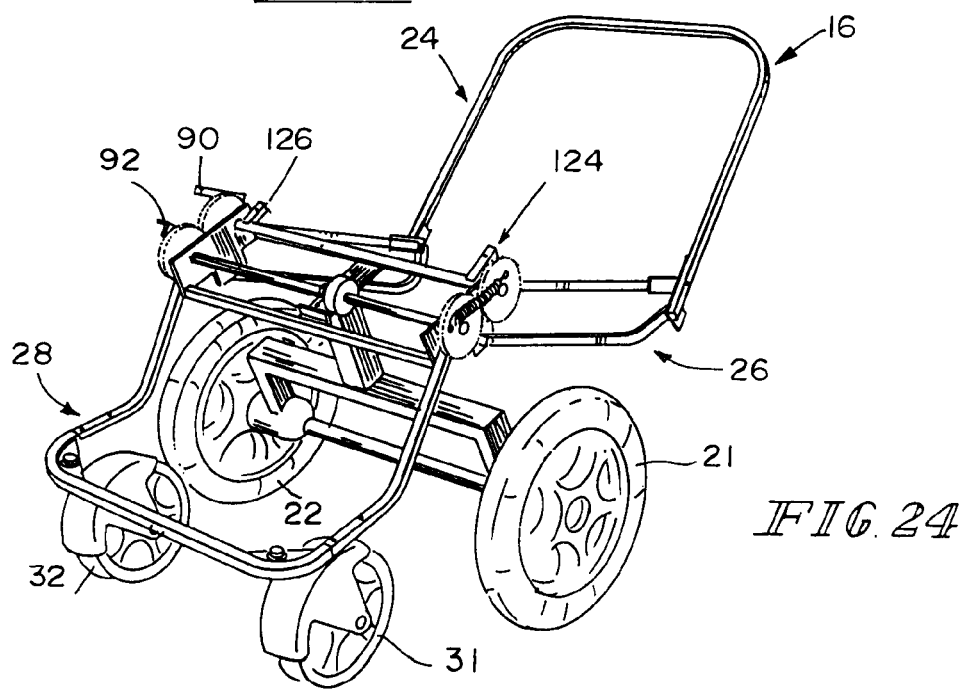
FIG. 24 is a view similar to FIG. 23 after the foldable frame has been folded partly to assume the position shown in FIGS. 1 and 11.
Figure 25:
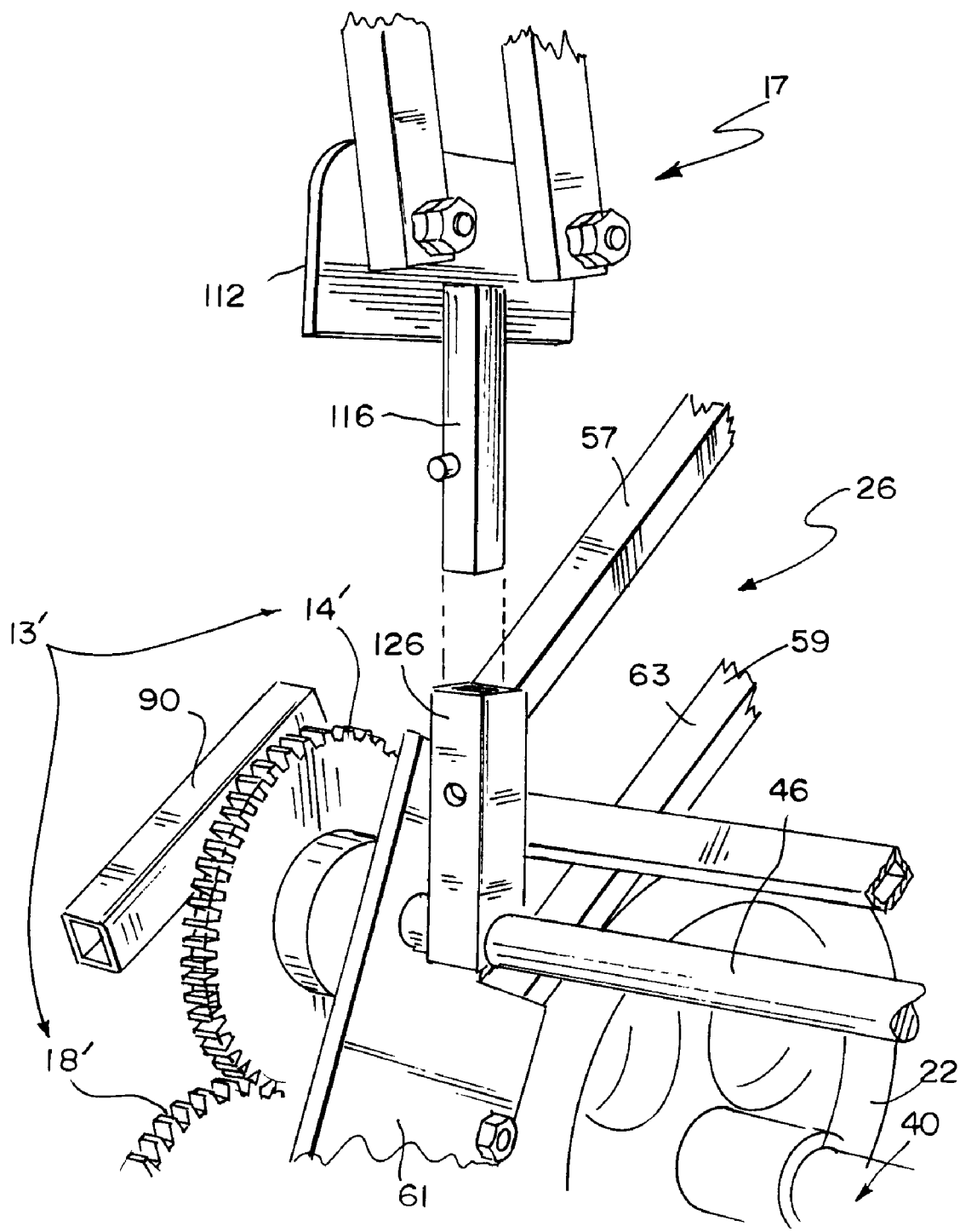
FIG. 25 is an enlarged view of a portion of the foldable frame of FIG. 23 showing downward movement of the foldable carrier support to mate with the gear-driven foldable frame.

In illustrative embodiments, foldable carrier support 17 is coupled to gear-driven foldable frame 12 by inserting first mount post 114 into a companion first socket 124 included in gear-driven foldable frame 12 and by inserting second mount post 116 into a companion second socket 126 included in gear-driven foldable frame 12 as suggested in FIGS. 23-25. In the illustrated embodiment, each of first and second sockets 124, 126 are coupled to rear gear axle 46 of pivot-control linkage 26 of cart pusher 24.

In a forward-facing mode of foldable carrier support 17, first and second seat rails 104, 106 are spread apart and located above unfolded gear-driven foldable frame 12 as suggested in FIG. 1. In a rearward-facing mode of foldable carrier support 17, first seat rail 104 is reclined to extend rearwardly through an interior region of cart pusher 24 bounded by push handle 16 and left- and right-side portions 54, 56 of pivot-control linkage 26 and second seat rail 106 is raised to extend in a nearly vertical direction as suggested in FIG. 2.

A folding sequence in which juvenile stroller 10 is collapsed to change from the expanded use mode shown in FIG. 1 to the compact collapsed storage mode shown in FIGS. 3 and 4 is shown in FIGS. 6-13. In the expanded use mode, foldable carrier support 17 is unfolded to assume a forward-facing orientation as suggested in FIGS. 6 and 7.

In a first stage, foldable carrier support 17 is folded by a caregiver as suggested in FIGS. 6-9. Second seat rail 106 of foldable carrier support 17 is pivoted about second pivot axis 108 in clockwise direction 109 to move upwardly toward first seat rail 105. Once foldable carrier support 17 is folded to assume a folded position shown in FIGS. 8 and 9, a caregiver can begin to fold gear-driven foldable frame 12.

Figure 10:
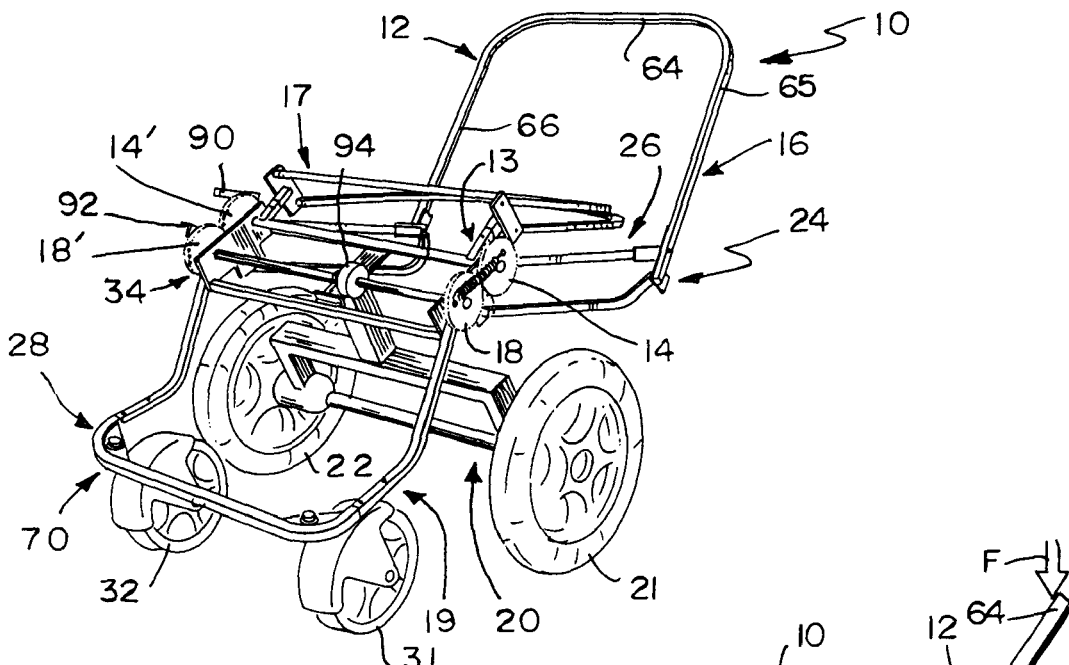

In a second stage, cart pusher 14 is folded by a caregiver to assume the folded rear position alongside a rear portion of cart 20 as suggested in FIGS. 10 and 11. The caregiver applies a downward force F to handgrip 64 of push handle 16 of cart pusher 14 as suggested in FIG. 11. Application of such a force F to push handle 16 causes pivot-control linkage 26 to move downwardly toward ground 68 and pivot about pivot axes 48 and 61. During such movement, an included angle θ between push handle 16 and upper rail 57 of pivot-control linkage 26 is reduced as suggested in FIGS. 9, 11, and 13 in response to pivotable movement of pivot-control linkage 26 relative to push handle 16 about pivots 60, 62.

During this second stage, gear system 13 functions to cause front wheel 31 to move in direction 30 closer to companion rear wheel 21 as suggested in FIGS. 9, 11, and 13. As noted herein, gear system 13 comprises a first drive gear 14 included in cart pusher 24 in mating engagement with a companion first driven gear 18 included in rolling cart stabilizer 28. As push handle 16 and pivot-control linkage 26 are folded, first drive gear 14 is rotated about rear pivot axis 48 in a clockwise direction to cause mating first driven gear 18 to rotate about front pivot axis 52 in a counterclockwise direction. This counterclockwise rotation of first driven gear 18 causes wheel mount 19 to pivot about front pivot axis 52 and move toward cart 20, which movement causes front wheel 31 carried on wheel mount 19 to move rearwardly in direction 30 toward rear wheel 21 included in cart 20 as suggested in FIGS. 11 and 12.

During a third stage, pivot-control linkage 26 of cart pusher 24 is moved in a forward direction to be aligned in closely confronting relation to wheel mount 19 of rolling cart stabilizer 28 to cause juvenile stroller 10 to assume the compact collapsed storage mode and occupy a space having a width 201 and a height 202. To reach this mode, push handle 16 moved to assume an over-center condition relative to pivot-control linkage 26 as suggested in FIGS. 16-18 to provide means for temporarily retaining push handle 16 in a fully folded position alongside pivot-control linkage 26. When juvenile stroller 10 has been reconfigured to assume the compact collapsed storage mode shown, for example, in FIGS. 3, 4, and 13, unfold-assist spring 88 has been loaded to store energy.

To cause gear-driven foldable frame 12 of juvenile stroller 10 to unfold and change juvenile stroller 10 from the compact collapsed storage mode to the expanded use mode, it is necessary only for the caregiver to lift upwardly on push handle 16. Energy stored in unfold-assist spring 88 is released to drive the folded gear-driven foldable frame 12 to an unfolded position relative to cart 20. Then, the caregiver can unfold the foldable carrier support 17 and select either a forward-facing orientation shown in FIG. 1 or a rearward-facing orientation shown in FIG. 2.

The invention claimed is:

1. A compact collapsible stroller comprising
a mobile base and
a juvenile seat coupled to the mobile base, wherein the mobile base includes a cart and a gear-driven foldable frame mounted for folding and unfolding movement on the cart and configured to include a cart pusher and a rolling cart stabilizer, the rolling cart stabilizer is mounted on the cart for pivotable movement about a front pivot axis between an unfolded front position extending in a forward direction away from the cart and a folded rear position alongside the cart, the cart pusher is mounted on the cart for pivotable movement about a rear pivot axis between an unfolded rear position extending in an opposite rearward direction away from the cart and a folded rear position alongside the cart, the rolling cart stabilizer includes a rotatable driven gear, and the cart pusher includes a rotatable drive gear mated to the rotatable driven gear to provide means for rotating the driven gear to move the rolling cart stabilizer relative to the cart about the front pivot axis from the unfolded front position to the folded front position in response to rotation of the drive gear caused by movement of the cart pusher relative to the cart about the rear pivot axis from the unfolded rear position to the folded rear position so that the stroller is converted from an expanded use mode to a compact collapsed storage mode
wherein the rolling cart stabilizer further includes a rotatable front gear axle coupled to the cart for rotation about the front pivot axis, a wheel mount coupled to the rotatable front gear axle and arranged to pivot about the front pivot axis in response to rotation of the front gear axle about the front pivot axis, and a front wheel coupled to the wheel mount, and wherein the rotatable front gear axle is coupled to the rotatable driven gear to rotate therewith in response to rotation of the rotatable drive gear during folding and unfolding of the gear-driven foldable frame.

2. The stroller of claim 1, wherein the cart includes a frame mount, a rear wheel, and a wheel axle coupled to the frame mount and the rear wheel and configured to support the rear wheel for rotation about an axis of rotation, and the rotatable front gear axle is coupled to the frame mount for rotation about the front pivot axis.

3. The stroller of claim 2, wherein the cart pusher includes a rotatable rear gear axle coupled to the frame mount for rotation about a rear pivot axis and coupled to the rotatable drive gear to support the rotatable drive gear for rotation about the rear pivot axis, a push handle, and a pivot-control linkage configured to include the rotatable drive gear and pivotably coupled to the push handle to provide means for rotating the rotatable drive gear in a first direction to cause the rotatable driven gear to rotate about the front pivot axis in an opposite second direction so that the rolling cart stabilizer pivots about the front pivot axis to move from the unfolded front position to the folded front position in response to pivoting movement of the push handle relative to the pivot-control linkage during movement of the cart pusher from the unfolded rear position to the folded rear position.

4. The stroller of claim 2, wherein the cart includes another rear wheel mounted for rotation about an axis of rotation established by the wheel axle, the frame mount includes an axle support, a frame support, and a frame-support elevator coupled to the axle support and to the frame support and configured to provide means for elevating the frame support above the axle support, the axle support is configured to support the wheel axle for rotation about the axis of rotation and lie between the rear wheels, and the rotatable front gear axle is coupled to the frame support for rotation about the front pivot axis.

5. The stroller of claim 1, wherein the wheel mount includes a wheel-support base coupled to the front wheel, a left-side base-carrier rail coupled to the wheel-support base and arranged to extend away from and pivot about the front pivot axis, and a right-side base-carrier rail coupled to the wheel-support base and arranged to lie in spaced-apart relation to the left-side base-carrier rail and to extend away from and pivot about the front pivot axis.

6. The stroller of claim 5, wherein one of the left-side and right-side base-carrier rails is coupled to the driven gear to rotate therewith about the front pivot axis during movement of the rolling cart stabilizer relative to the cart between the folded front and unfolded front positions.

7. The stroller of claim 5, wherein each of the left-side and right-side base carrier rails is shaped to resemble a hockey stick and includes a relatively longer inclined segment extending toward the front pivot axis and a relatively shorter horizontal segment coupled to the wheel-support base and a companion one of the relatively longer inclined segments.

8. The stroller of claim 5, wherein each of the left-side and right-side base-carrier rails are arranged to lie in substantially perpendicular relation to the wheel-support base to provide wheel-support base with a substantially U-shaped configuration.

9. The stroller of claim 1, wherein the cart pusher includes a push handle and a pivot-control linkage having an inner portion coupled to the cart for pivotable movement about the rear pivot axis and an outer portion pivotably coupled to the push handle.

10. The stroller of claim 9, wherein the inner portion includes the rotatable drive gear.

11. The stroller of claim 1, wherein the cart pusher includes a rotatable rear gear axle coupled to the cart for rotation about the rear pivot axis and coupled to the rotatable drive gear to support the rotatable drive gear for rotation about the rear pivot axis, a push handle, and a pivot-control linkage configured to include the rotatable drive gear and pivotably coupled to the push handle.

12. The stroller of claim 11, wherein the pivot-control linkage includes an upper rail, a lower rail, and a medial rail, the upper rail is coupled at one end thereof to the rotatable rear gear axle and at an opposite end thereof to the medial rail at a first pivot, the lower rail is coupled at one end thereof to the cart at a second pivot and at an opposite end thereof to the medial rail at a third pivot.

13. The stroller of claim 12, wherein the lower rail includes an inner segment that is coupled to the cart at the second pivot and arranged to lie in substantially spaced-apart relation to the upper rail upon movement of the cart pusher to the unfolded rear position, the lower rail also includes an outer segment that is mated with the inner segment to define an obtuse included angle therebetween and that is coupled at a free end thereof to the medial rail at the third pivot, and the medial rail is L-shaped and includes a short segment coupled to the lower rail at the third pivot and a relatively longer segment coupled to the upper rail at the first pivot.

14. The stroller of claim 13, wherein the push handle includes a handgrip, a first arm coupled to one end of the handgrip, and a second arm coupled to an opposite end of the handgrip, a free end of the first arm is coupled to the relatively longer segment of medial rail to provide means for supporting the first arm for pivotable movement relative to the upper rail about the first pivot and relative to the lower rail about the third pivot during folding movement of the cart pusher from the unfolded rear position to the folded rear position so that during such movement, an over-center condition relating to the first pivot exists wherein the first pivot is moved from a point above a reference line interconnecting the second and third pivots to a point below that reference line to provide means for retaining the push handle in a nested position alongside the upper rail to enhance the compactness of the collapsed juvenile stroller and so that such an over-center condition vanishes as soon as a caregiver pulls on the push handle to move the push handle away from the pivot-control linkage to change the juvenile stroller from the compact collapsed storage mode to the expanded use mode.

15. The stroller of claim 1, further comprising a fold control unit including an unfold-limit stop coupled to the rolling cart stabilizer and to the cart pusher and configured to provide means for limiting unfolding movement of the rolling cart stabilizer relative to the cart pusher during change of the juvenile stroller from the compact collapsed storage mode to the expanded use mode to establish relative positions of the rolling cart stabilizer and the push cart in the expanded use mode.

16. The stroller of claim 15, wherein the unfold-limit stop includes a motion-blocking post coupled to the cart pusher to move therewith relative to the cart and a foundation plate coupled to the rolling art stabilizer to move therewith relative to the cart, the motion-blocking post is arranged to lie in separated relation to the foundation plate when the juvenile stroller is collapsed to assume the compact collapsed storage mode, and the motion-blocking post is arranged to engage the foundation plate to limit rotation of the drive gear about the rear pivot axis to establish the expanded use mode of the juvenile stroller.

17. The stroller of claim 16, wherein the motion-blocking post is coupled to the drive gear to rotate therewith and the foundation plate is coupled to the driven gear to rotate therewith.

18. The stroller of claim 16, wherein the fold control unit further includes an unfold-assist spring coupled to the cart and to the cart pusher to provide means for yieldably moving the rolling cart stabilizer relative to the cart in response to unfolding movement of the cart pusher from the folded rear position to the unfolded rear position during change of the juvenile stroller from the compact collapsed storage mode to the expanded use mode.

19. The stroller of claim 18, wherein the rolling cart stabilizer further includes a rotatable front gear axle coupled to the cart for rotation about the front pivot axis, a wheel mount coupled to the rotatable front gear axle and arranged to pivot about the front pivot axis in response to rotation of the front gear axle about the front pivot axis, and a front wheel coupled to the wheel mount, and wherein the rotatable front gear axle is coupled to the rotatable driven gear to rotate therewith in response to rotation of the rotatable drive gear during folding and unfolding of the gear-driven foldable frame and wherein the unfold-assist spring comprises a torsion spring coupled to the rotatable front gear axle and to the cart.

20. A compact collapsible stroller comprising
a mobile base and
a juvenile seat coupled to the mobile base, wherein the mobile base comprises a cart including two rear wheels and a gear-driven foldable frame mounted on the cart and configured to include at least one front wheel, the cart also includes a wheel axle interconnecting the two rear wheels and a frame mount coupled to the wheel axle, the gear-driven foldable frame further includes a cart pusher coupled for movement about a rear pivot axis to a rear portion of the cart and configured to include a drive gear and a rolling cart stabilizer coupled for movement about a front pivot axis to a front portion of the cart and configured to include the at least one front wheel and a driven gear mating with the drive gear, the gear-driven foldable frame is configured to be folded to establish a compact collapsed storage mode of the stroller and unfolded to establish an expanded use mode of the stroller, and the gear-driven foldable frame is mounted on the frame mount of the cart for folding movement relative to the cart to cause the cart pusher and the rolling cart stabilizer to move relative to the cart during folding and unfolding of the gear-driven foldable frame
wherein the gear-driven foldable frame is mounted on the cart via a single center post connector that is spaced horizontally apart from the gears and located at a substantially central portion of the frame mount, and the single connector includes a first end coupled to a first frame support of the frame mount and a second end coupled to a second frame support of the frame mount.

21. The stroller of claim 20, wherein the juvenile seat is mounted on the cart to move therewith, the juvenile seat includes a foldable carrier support mounted on the gear-driven foldable frame and a child carrier configured to mount on the foldable carrier support to move therewith.

22. The stroller of claim 20, wherein the cart pusher includes a push handle and a rotatable rear gear axle coupled to the frame mount of the cart to establish the rear pivot axis and the drive gear is coupled to the rear gear axle to rotate therewith relative to the frame mount during folding and unfolding of the gear-driven foldable frame.

23. The stroller of claim 20, wherein the rolling cart stabilizer includes a wheel mount coupled to the at least one front wheel and a rotatable front gear axle coupled to the wheel mount to establish the front pivot axis and the driven gear is arranged to mate with the drive gear of the cart pusher and coupled to the front gear axle to rotate therewith relative to the frame mount during folding and unfolding of the gear-driven foldable frame.

24. The stroller of claim 20, wherein the drive gear is supported for rotation about the rear pivot axis, the driven gear is supported for rotation about the front pivot axis, and the drive gear and driven gear cooperate to provide means for using movement of the cart pusher relative to the cart toward a folded rear position alongside a rear portion of the cart to rotate the drive gear in a first direction causing the mating driven gear to rotate in an opposite direction so that such rotation of the driven gear rotates a front gear axle extending along the front pivot axis included in the rolling cart stabilizer and arranged to cause pivoting movement of the rolling cart stabilizer relative to the cart about the front pivot axis established by the front gear axle toward a folded front position alongside a front portion of the cart and the drive and driven gears are mated and used to transmit motion from a rotating rear gear axle included in the cart pusher to the front gear axle of the rolling cart stabilizer to cause the rolling cart stabilizer to pivot from an unfolded front position extending in a forward direction away for the cart to a folded front position alongside the front portion of the cart whenever the cart pusher is moved by a caregiver from an unfolded rear position extending in a rearward direction away from the cart to a folded rear position alongside the rear portion of the cart to cause the compact collapsible stroller to change from an expanded use mode to a compact collapsed storage mode.

25. The stroller of claim 20, wherein the cart pusher includes a rotatable rear gear axle coupled to the cart for rotation about the rear pivot axis and coupled to the rotatable drive gear to support the rotatable drive gear for rotation about the rear pivot axis, a push handle, and a pivot-control linkage configured to include the rotatable drive gear and pivotably coupled to the push handle.

26. The stroller of claim 25, wherein the pivot-control linkage includes an upper rail, a lower rail, and a medial rail, the upper rail is coupled at one end thereof to the rotatable rear gear axle and at an opposite end thereof to the medial rail at a first pivot, the lower rail is coupled at one end thereof to the cart at a second pivot and at an opposite end thereof to the medial rail at a third pivot.

27. The stroller of claim 20, further comprising a fold control unit including an unfold-limit stop coupled to the rolling cart stabilizer and to the cart pusher and configured to provide means for limiting unfolding movement of the rolling cart stabilizer relative to the cart pusher during change of the juvenile stroller from the compact collapsed storage mode to the expanded use mode to establish relative positions of the rolling cart stabilizer and the push cart in the expanded use mode.

28. The stroller of claim 27, wherein the unfold-limit stop includes a motion-blocking post coupled to the cart pusher to move therewith relative to the cart and a foundation plate coupled to the rolling art stabilizer to move therewith relative to the cart, the motion-blocking post is arranged to lie in separated relation to the foundation plate when the juvenile stroller is collapsed to assume the compact collapsed storage mode, and the motion-blocking post is arranged to engage the foundation plate to limit rotation of the drive gear about the rear pivot axis to establish the expanded use mode of the juvenile stroller.

29. The stroller of claim 28, wherein the motion-blocking post is coupled to the drive gear to rotate therewith and the foundation plate is coupled to the driven gear to rotate therewith.

30. The stroller of claim 28, wherein the fold control unit further includes an unfold-assist spring coupled to the cart and to the cart pusher to provide means for yieldably moving the rolling cart stabilizer relative to the cart in response to unfolding movement of the cart pusher from the folded rear position to the unfolded rear position during change of the juvenile stroller from the compact collapsed storage mode to the expanded use mode.

31. A compact collapsible stroller, comprising
a juvenile seat,
a cart underlying the juvenile seat and including a frame mount and at least one rear wheel mounted for rotation relative to the frame mount,
a cart pusher mounted on the frame mount for pivotable movement about a rear pivot axis, the cart pusher including a push handle and a pivot-control linkage mating with the push handle at a handle pivot and including a drive gear, and
a rolling cart stabilizer mounted on the frame mount for pivotable movement about a front pivot axis, the rolling cart stabilizer including at least one front wheel and a driven gear, and wherein the drive gear and the driven gear are configured and arranged to mesh to provide means for pivoting the rolling cart stabilizer relative to the frame mount about the front pivot axis in response to pivoting motion of the pivot-control linkage relative to the frame mount about the rear pivot axis and to pivoting movement of the push handle relative to the pivot-control linkage about the handle pivot.

32. The stroller of claim 31, wherein the juvenile seat is mounted on the cart pusher to move therewith relative to the cart.

33. The stroller of claim 32, wherein the juvenile seat includes a foldable carrier support mounted on the pivot-control linkage to move therewith and a child carrier configured to mount on the foldable carrier support to move therewith.

34. The stroller of claim 31, further comprising a motion-blocking post coupled to the pivot-control linkage of the cart pusher and a foundation plate coupled to the rolling cart stabilizer and wherein the motion-blocking post is arranged to move about the rear pivot axis to engage the foundation plate when the cart pusher and rolling cart stabilizer are pivoted relative to the frame mount to assumed unfolded positions relative to the cart to establish an unfold-limit stop system to limit movement of the pivot-control linkage of the cart pusher relative to the rolling cart stabilizer to establish an expanded use mode of the compact collapsible stroller.

35. The stroller of claim 34, wherein the motion-blocking post is coupled to the drive gear to rotate therewith and the foundation plate is coupled to the driven gear to rotate therewith.

36. The stroller of claim 34, further comprising an unfold-assist spring coupled to the cart and to the rolling cart stabilizer and configured to provide means for yieldably moving the rolling cart stabilizer relative to the cart in response to movement of the push handle of the cart pusher away from the cart.

37. A compact collapsible stroller comprising
a juvenile seat,
a gear-driven foldable frame having a gear system configured to control folding and unfolding of components included in the gear-driven foldable frame as the stroller is changed from an expanded use mode to a compact collapsed storage mode, the juvenile seat being coupled to the gear-driven foldable frame to move therewith, and
a cart including a frame mount coupled to the gear-driven foldable frame and rolling wheels mounted for rotation relative to the frame mount to support the juvenile seat and gear-driven foldable frame for rolling motion once the stroller is changed to the expanded use mode
wherein the frame mount is mounted on the cart via a single connector, the single connector including a first end coupled to a first frame support of the frame mount and a second end coupled to a second frame support of the frame mount.

38. The stroller of claim 37, wherein the gear-driven foldable frame includes a cart pusher including a push handle and a pivot-control linkage providing a drive gear and mating with the push handle at a handle pivot and the frame mount of the cart at a rear pivot axis and a rolling cart stabilizer mating with the frame mount of the cart at a front pivot mount and including a front-wheel wheel mount, at least one front wheel coupled to the front-wheel wheel mount, and a driven gear, the drive gear included in the cart pusher mates with the driven gear included in the rolling cart stabilizer to establish the gear system and provide means for moving the rolling cart stabilizer from an unfolded position extending away from the cart to a folded front position alongside a front portion of the cart in response to movement of the pivot-control linkage about the rear pivot axis from an unfolded position extending away from the cart to a folded position aligned in closely confronting relation to the front-wheel wheel mount and pivoting movement of the push handle relative to the pivot-control linkage about the handle pivot so that the juvenile stroller is changed from the expanded use mode to assume the compact collapsed storage mode.

39. A compact collapsible stroller comprising
a cart including a frame mount and at least one rear wheel mounted to rotate relative to the frame mount,
a rolling cart stabilizer including a front-wheel mount, at least one front wheel mounted to rotate relative to the front-wheel wheel mount, a front gear axle rotatably coupled to the frame mount to establish a front pivot axis, and a driven gear coupled to the front gear axle to rotate therewith, the front gear axle and the driven gear cooperating to provide front means for supporting the front-wheel wheel mount for pivotable movement about the front pivot axis relative to the frame mount to support the rolling cart stabilizer for movement between an unfolded front position extending in a forward direction away from the cart and a folded front position alongside a front portion of the cart,
a cart pusher including a push handle and a pivot-control linkage interconnecting the frame mount and the push handle, the pivot-control linkage including a rear gear axle rotatably coupled to the frame mount to establish a rear pivot axis, a drive gear coupled to the rear gear axle to rotate therewith, and a side portion, the push handle being coupled to the side portion of the pivot-control linkage for pivotable movement at a handle pivot, the rear gear axle and the drive gear cooperating to provide rear means for supporting the side portion for pivotable movement about the rear pivot axis relative to the frame mount to support the cart pusher for movement between an unfolded rear position extending in a rearward direction away from the cart and a folded rear position alongside a rear position of the cart, and a juvenile seat coupled to the cart pusher to move therewith relative to the cart.

40. A compact collapsible stroller comprising a mobile base, a juvenile seat coupled to the mobile base, wherein the mobile base includes a cart and a gear-driven foldable frame mounted for folding and unfolding movement on the cart and configured to include a cart pusher and a rolling cart stabilizer, the rolling cart stabilizer is mounted on the cart for pivotable movement about a front pivot axis between an unfolded front position extending in a forward direction away from the cart and a folded rear position alongside the cart, the cart pusher is mounted on the cart for pivotable movement about a rear pivot axis between an unfolded rear position extending in an opposite rearward direction away from the cart and a folded rear position alongside the cart, the rolling cart stabilizer includes a rotatable driven gear, and the cart pusher includes a rotatable drive gear mated to the rotatable driven gear to provide means for rotating the driven gear to move the rolling cart stabilizer relative to the cart about the front pivot axis from the unfolded front position to the folded front position in response to rotation of the drive gear caused by movement of the cart pusher relative to the cart about the rear pivot axis from the unfolded rear position to the folded rear position so that the stroller is converted from an expanded use mode to a compact collapsed storage mode, and wherein the gear-driven foldable frame is coupled to the mobile base via a single connector, the single connector being spaced horizontally apart from the gears and located at a substantially central portion of the cart.

* * * * *